US012634146B2

(12) United States Patent (10) Patent No.: US 12,634,146 B2
Koulouris et al. (45) Date of Patent: May 19, 2026

(54) MONITORING USER SPACE PROCESSES USING HEARTBEAT MESSAGES AUTHENTICATED BASED ON INTEGRITY MEASUREMENTS

(71) Applicant: HEWLETT PACKARD ENTERPRISE DEVELOPMENT LP, Spring, TX (US)

(72) Inventors: Theofrastos Koulouris, Bristol (GB); Geoffrey Ndu, Bristol (GB); Nigel J. Edwards, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 232 days.

(21) Appl. No.: 18/536,708

(22) Filed: Dec. 12, 2023

(65) Prior Publication Data

US 2025/0193019 A1     Jun. 12, 2025

(51) Int. Cl.
| | |
|---|---|
| *H04L 9/32* | (2006.01) |
| *G06F 21/52* | (2013.01) |
| *G06F 21/57* | (2013.01) |
| *H04L 9/06* | (2006.01) |
| *H04L 9/40* | (2022.01) |

(52) U.S. Cl.
CPC ............ *H04L 9/3242* (2013.01); *G06F 21/52* (2013.01); *G06F 21/57* (2013.01); *G06F 2221/034* (2013.01); *H04L 9/0643* (2013.01); *H04L 9/40* (2022.05); *H04L 2209/88* (2013.01)

(58) Field of Classification Search
None
See application file for complete search history.

(56) References Cited

U.S. PATENT DOCUMENTS

| | | | | | |
|---|---|---|---|---|---|
| 9,680,805 | B1 * | 6/2017 | Rodgers | .................. | G06F 16/84 |
| 10,795,739 | B1 * | 10/2020 | Klee | ...................... | G06F 21/52 |

(Continued)

FOREIGN PATENT DOCUMENTS

| | | | | | |
|---|---|---|---|---|---|
| AU | 2022283634 | A1 * | 9/2023 | ............... | H04L 9/08 |
| CN | 103189872 | B * | 5/2016 | ........... | H04L 63/102 |

(Continued)

OTHER PUBLICATIONS

Kovalev, Daniil; GitHub; "Simple Process Integrity Checker"; https://github.com/kovdan01/proc-integrity; downloaded Nov. 8, 2023; 4 pp.

(Continued)

*Primary Examiner* — Ali H. Cheema
(74) *Attorney, Agent, or Firm* — Trop, Pruner & Hu, P.C.

(57) ABSTRACT
A technique includes receiving, by a monitoring agent, heartbeat messages that are associated with a status of a process of a computer system. The technique includes determining, by the monitoring agent and based on the heartbeat messages, whether the process has an expected state. The determination includes authenticating a given heartbeat message based on a content of the given heartbeat message and an expected integrity measurement of the process. The technique includes initiating, by the monitoring agent, a responsive action to counter tampering with the process responsive to the determination of whether the process has an expected state.

18 Claims, 9 Drawing Sheets

(56) References Cited

U.S. PATENT DOCUMENTS

| | | | | |
|---|---|---|---|---|
| 11,636,214 | B2 * | 4/2023 | Ndu | G06F 21/552 |
| | | | | 726/22 |
| 11,714,910 | B2 * | 8/2023 | Ndu | G06F 21/575 |
| | | | | 726/23 |
| 2005/0125202 | A1 * | 6/2005 | Gotkis | G05B 23/0254 |
| | | | | 257/E21.528 |
| 2009/0217377 | A1 * | 8/2009 | Arbaugh | G06F 11/3495 |
| | | | | 726/23 |
| 2010/0268692 | A1 * | 10/2010 | Resch | G06F 16/1748 |
| | | | | 707/687 |
| 2011/0307447 | A1 * | 12/2011 | Sabaa | H04L 67/568 |
| | | | | 707/693 |
| 2013/0104239 | A1 * | 4/2013 | McLachlan | G06F 7/588 |
| | | | | 726/26 |
| 2014/0279985 | A1 * | 9/2014 | Fontenot | G06F 21/57 |
| | | | | 707/698 |
| 2014/0334900 | A1 * | 11/2014 | Jones | B42C 11/00 |
| | | | | 412/11 |
| 2018/0054309 | A1 * | 2/2018 | Campagna | H04L 9/0822 |
| 2019/0012490 | A1 | 1/2019 | Khatri et al. | |
| 2019/0021002 | A1 * | 1/2019 | Kang | H04W 8/04 |
| 2020/0065197 | A1 * | 2/2020 | Stronge | G06F 16/128 |
| 2020/0266984 | A1 * | 8/2020 | Endress | H04L 9/3247 |
| 2022/0100908 | A1 * | 3/2022 | N | G06F 21/72 |
| 2022/0108008 | A1 * | 4/2022 | Bronk | H04L 63/0823 |
| 2022/0188423 | A1 * | 6/2022 | Ndu | G06F 21/577 |
| 2025/0023724 | A1 * | 1/2025 | Morita | G06F 21/51 |

FOREIGN PATENT DOCUMENTS

| | | | | | |
|---|---|---|---|---|---|
| CN | 109992987 | A | * | 7/2019 | G06F 21/6209 |
| CN | 109408463 | B | * | 12/2020 | |
| CN | 113190831 | A | * | 7/2021 | G06F 21/45 |
| CN | 113448681 | A | * | 9/2021 | G06F 21/51 |
| CN | 110134235 | B | * | 4/2022 | G09B 7/02 |
| CN | 116248465 | A | * | 6/2023 | H04L 41/0213 |
| JP | 2005208762 | A | * | 8/2005 | G06F 11/261 |
| KR | 102329580 | B1 | * | 11/2021 | H04L 9/0869 |
| TW | I764971 | B | * | 5/2022 | H04L 41/12 |

OTHER PUBLICATIONS

Wikipedia; "HMAC;" retrieved from https://en.wikipedia.org/wiki/HMAC, Dec. 9, 2023; 7 pp.

Part I, Section 11.4.11 of the Trusted Platform Module Library Specification, Family 2.0, Level 00, Revision 01.59, Trusted Computing Group, pp. 47-49, Nov. 2019; 3 pp.

Part I, Section 11.4.4 of the Trusted Platform Module Library Specification, Family 2.0, Level 00, Revision 01.59, Trusted Computing Group, p. 38, Nov. 2019; 1 p.

"Exploit Mitigation—PIE", available online at <https://exploit.courses/files/bfh2017/day5/0x53_ExploitMitigations_PIE.pdf>, 2017, 24 pages.

Sergiu Gatlan, "Ransomware gangs abuse Process Explorer driver to kill security software", available online at <https://www.bleepingcomputer.com/news/security/ransomware-gangs-abuse-process-explorer-driver-to-kill-security-software/>, Apr. 19, 2023 , 35 pages.

Sergiu Gatlan, "Terminator antivirus killer is a vulnerable Windows driver in disguise", available online at <https://www.bleepingcomputer.com/news/security/terminator-antivirus-killer-is-a-vulnerable-windows-driver-in-disguise/> May 31, 2023 , 35 pages.

* cited by examiner

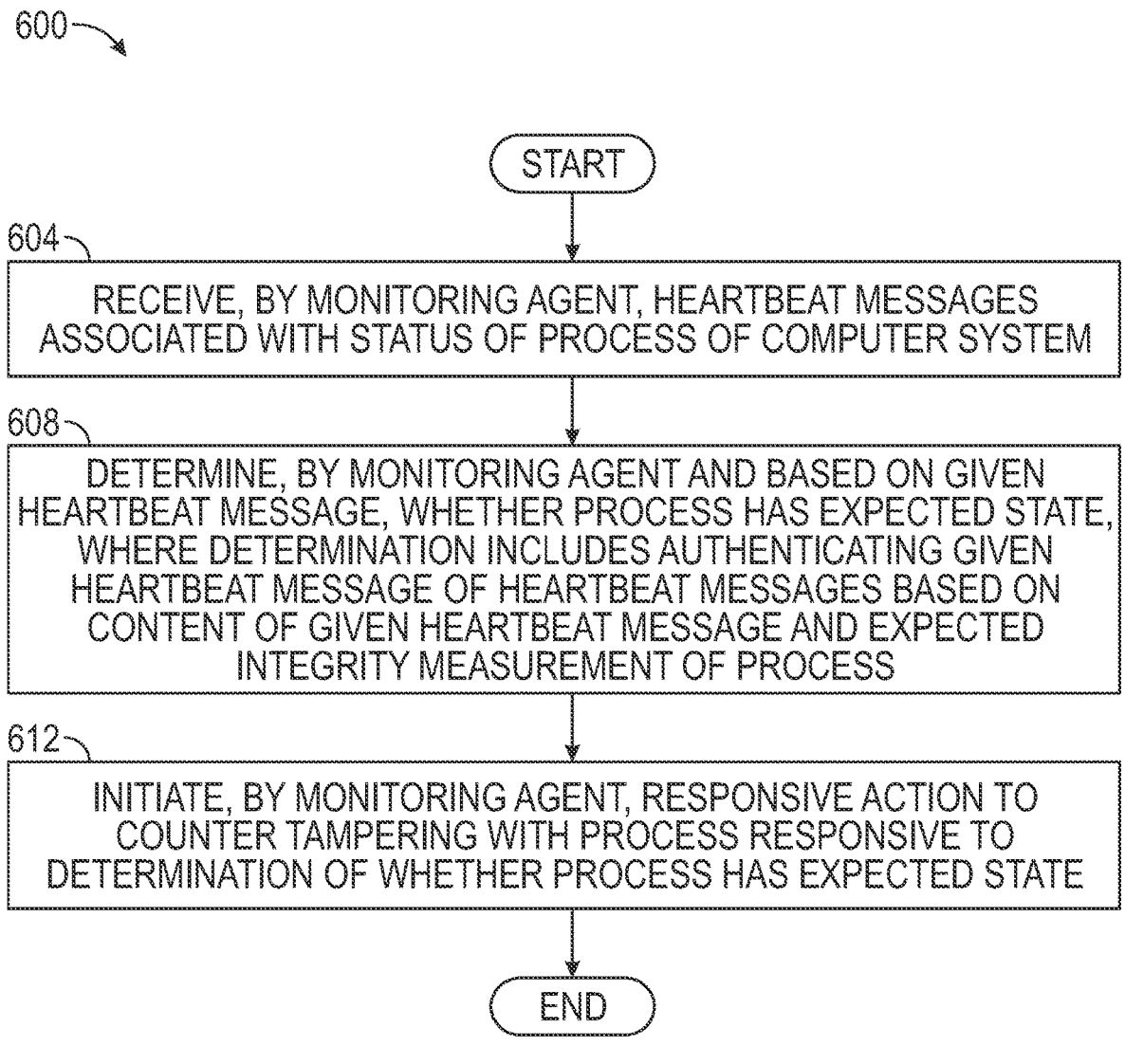

600

START

604

RECEIVE, BY MONITORING AGENT, HEARTBEAT MESSAGES ASSOCIATED WITH STATUS OF PROCESS OF COMPUTER SYSTEM

608

DETERMINE, BY MONITORING AGENT AND BASED ON GIVEN HEARTBEAT MESSAGE, WHETHER PROCESS HAS EXPECTED STATE, WHERE DETERMINATION INCLUDES AUTHENTICATING GIVEN HEARTBEAT MESSAGE OF HEARTBEAT MESSAGES BASED ON CONTENT OF GIVEN HEARTBEAT MESSAGE AND EXPECTED INTEGRITY MEASUREMENT OF PROCESS

612

INITIATE, BY MONITORING AGENT, RESPONSIVE ACTION TO COUNTER TAMPERING WITH PROCESS RESPONSIVE TO DETERMINATION OF WHETHER PROCESS HAS EXPECTED STATE

END

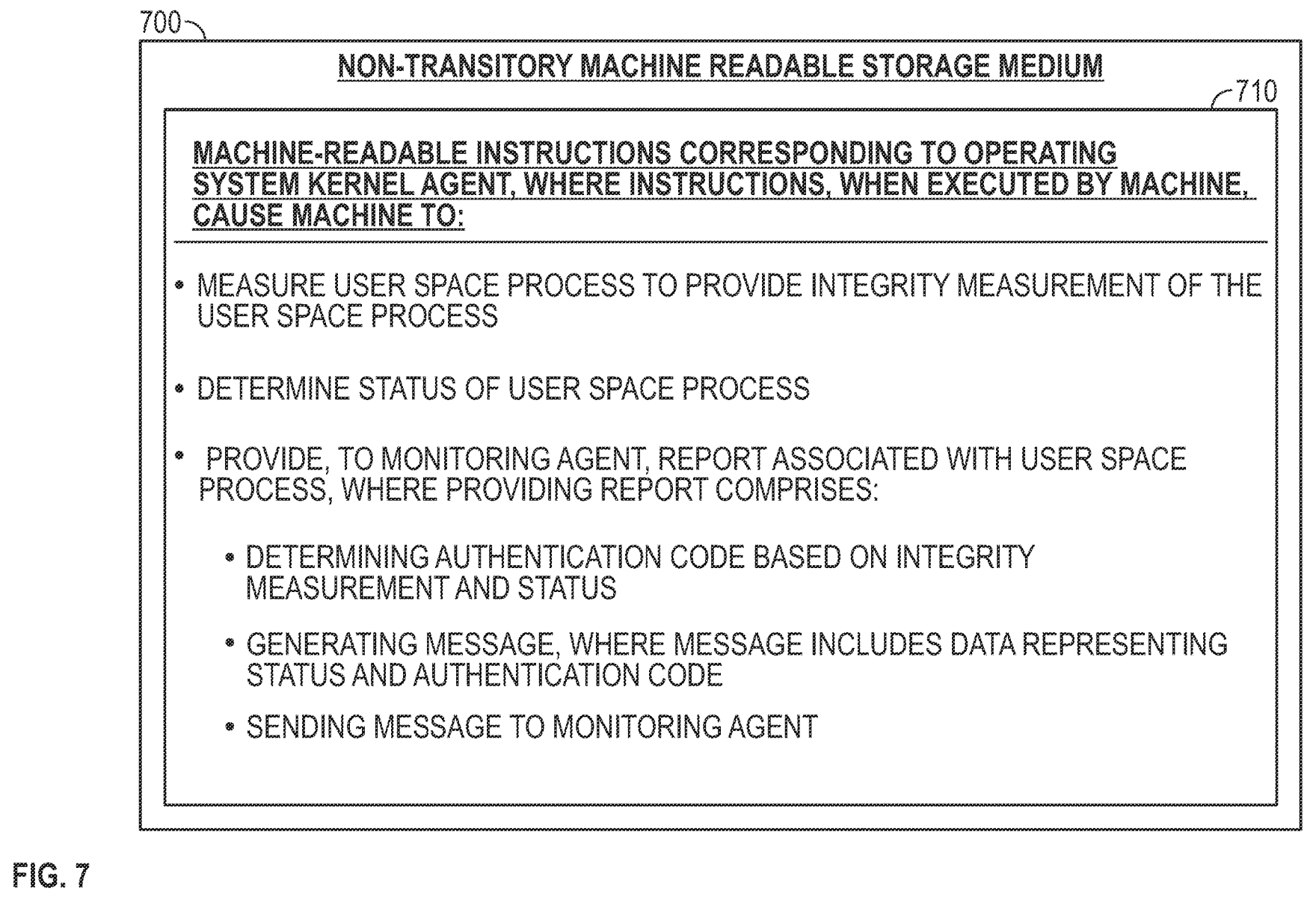

NON-TRANSITORY MACHINE READABLE STORAGE MEDIUM

710

MACHINE-READABLE INSTRUCTIONS CORRESPONDING TO OPERATING SYSTEM KERNEL AGENT, WHERE INSTRUCTIONS, WHEN EXECUTED BY MACHINE, CAUSE MACHINE TO:

• MEASURE USER SPACE PROCESS TO PROVIDE INTEGRITY MEASUREMENT OF THE USER SPACE PROCESS

• DETERMINE STATUS OF USER SPACE PROCESS

• PROVIDE, TO MONITORING AGENT, REPORT ASSOCIATED WITH USER SPACE PROCESS, WHERE PROVIDING REPORT COMPRISES:

• DETERMINING AUTHENTICATION CODE BASED ON INTEGRITY MEASUREMENT AND STATUS

• GENERATING MESSAGE, WHERE MESSAGE INCLUDES DATA REPRESENTING STATUS AND AUTHENTICATION CODE

• SENDING MESSAGE TO MONITORING AGENT

FIG. 7

MONITORING USER SPACE PROCESSES USING HEARTBEAT MESSAGES AUTHENTICATED BASED ON INTEGRITY MEASUREMENTS

BACKGROUND

A computer platform may be subject to a security attack in which a malevolent actor seeks to access information that is stored on the computer platform or harm components of the computer platform. A computer platform may have various defenses for purposes of preventing security attacks or at least mitigating the degree of harm inflicted by security attacks.

BRIEF DESCRIPTION OF THE DRAWINGS

FIG. 6 is a flow diagram depicting a technique to monitor a user space process using heartbeat messages and authenticate a given heartbeat message based on an integrity measurement of the process according to an example implementation.

FIG. 7 is an illustration of a non-transitory storage medium that stores machine-readable instructions that correspond to an operating system kernel agent and are executed to cause a machine to provide a heartbeat message having an authentication code derived from an integrity measurement of a user space process according to an example implementation.

DETAILED DESCRIPTION

Figure 1:
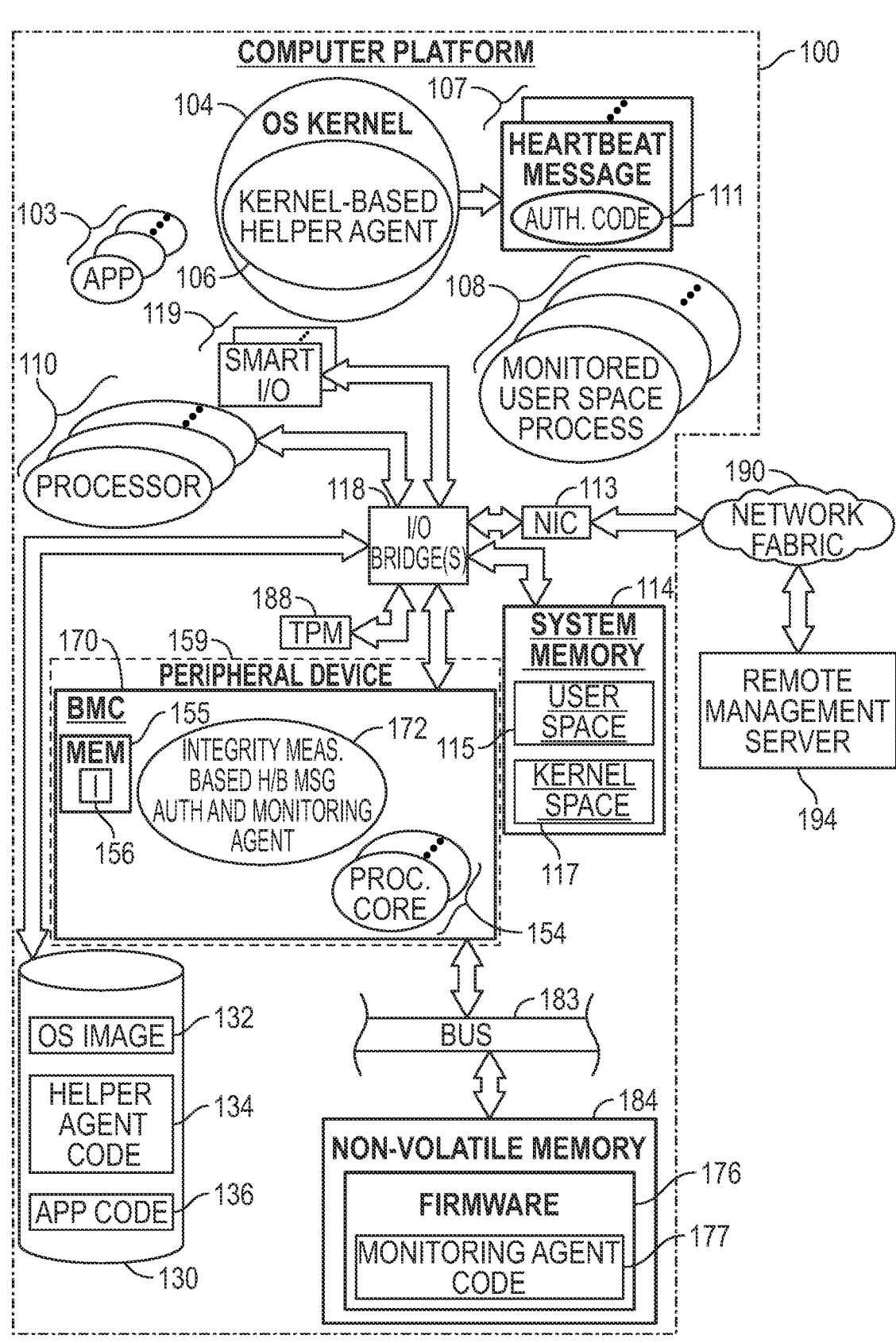
FIG. 1 is a schematic diagram of a computer platform that has a process monitoring infrastructure that uses heartbeat message authentication as a mechanism to detect tampering with a monitored user space process according to an example implementation.

A computer platform (e.g., a server, a portable computer or other processor-based electronic device) may have one or multiple user space processes that provide security services for the computer platform. Malware may potentially stop or modify security service-related user space processes of a computer platform for such purposes as avoiding detection, resisting removal and proceeding deeper into a computer network to which the computer platform is connected. The killing of security service-related user space processes may be combined with other malware-based attacks (e.g., injection attacks and process hollowing attacks) for purposes of evading defenses of the computer platform, as well as possibly elevating privileges for malevolent actors.

A computer platform may include a process monitoring infrastructure to monitor a security-related user space process for purposes of detecting if the process has unexpectedly stopped or has been modified. Such detection allows the computer platform to timely initiate one or multiple actions to counter a potential security attack. The process monitoring infrastructure may include a watchdog device and an operating system kernel-based agent. The kernel-based agent may continually monitor a status (e.g., running or stopped) of the user space process and generate corresponding status update reports that are monitored by the watchdog device. In this manner, the watchdog device may be alerted to a potential security attack if a report reveals that the process has unexpectedly stopped. As an added layer of defense, the status update reports may be heartbeat messages. The watchdog device expects to receive each heartbeat message within an expected time period. Interruption of the heartbeat messaging (e.g., a heartbeat message not being received by the watchdog device within the expected time period) alerts the watchdog device to potential tampering activity.

A sophisticated malevolent actor may subvert heartbeat message-based process monitoring in a way that presents an illusion that the user space process is operating as expected. For example, a malevolent actor may modify a user space process in a way that avoids modification detection and allows the user space process to continue to run. The kernel-based agent may be unaware that the user space process has been compromised and continue to send out heartbeat messages, as scheduled, which indicate that that the process is running as expected.

In accordance with example implementations, a computer platform includes a process monitoring infrastructure that uses heartbeat message authentication as a mechanism to detect tampering with a monitored user space process. The process monitoring infrastructure, in accordance with example implementations, includes an operating system kernel-based helper agent and a watchdog, or monitoring, agent, which is external to the kernel. The helper agent generates heartbeat messages to report on a state of a user space process. The monitoring agent processes each heartbeat message for purposes of determining whether a state of the user space process, as represented by the heartbeat message, corresponds to an expected state for the process. The helper agent, for each generated heartbeat message, measures the user space process to derive a current integrity measurement of the process, and the helper agent incorporates authentication information into the heartbeat message, which is derived from the current integrity measurement. The monitoring agent authenticates each heartbeat message based on the authentication information that is contained in the heartbeat message and an expected integrity measurement for the user space process. As described further herein, a heartbeat message fails authentication if the current integrity measurement of the user space process differs from the expected integrity measurement for the user space process. Therefore, even if a sophisticated malevolent actor modifies the user space process in a way that keeps the user space process running, any heartbeat message generated after the modification fails authentication. An authentication failure, in turn, alerts the monitoring agent to potential tampering with the monitored user space process.

A "heartbeat message," in the context that is used herein, refers to a unit of data, which reports the status of a process and is expected to be received within an expected period (e.g., each heartbeat message is expected be received within a certain time period after receipt of the last received heartbeat message or received according to another measure of time). "Authenticating" a heartbeat message, in the context that is used herein, refers to determining, based on certain content of the heartbeat message and an expected integrity measurement of a process, whether the heartbeat message may be relied on as a source for the status of the process. In accordance with example implementations, a heartbeat message passing authentication is an assurance that the user space process associated with the heartbeat message has not been altered, or modified. A heartbeat message failing authentication alerts the process monitoring infrastructure to potential tampering activity (e.g., tampering with the monitored user space process and/or tampering with the helper agent).

The monitoring agent is constructed to process a heartbeat message for purposes of determining whether a state of a user space process corresponds to an expected state for the user state process. In the context that is used herein, the "state" of a user space process refers to a collection of one or multiple characteristics of the user space process. In an example, the state of a user space process may correspond to a status of the process, such as whether the process is running or has stopped. An expected state for a user space process may include an expected status (e.g., a running status). Determining whether a user space process has an expected state may include determining whether a status represented by a heartbeat message corresponds to the expected status.

In another example, a state of a user space process may correspond to an integrity measurement of the process. Determining whether a state (e.g., the state represented by a heartbeat message) of the user space process corresponds to an expected state for the process may include determining whether an integrity measurement (e.g., an integrity measurement represented by a heartbeat message) of the user space process matches a reference, or expected, integrity measurement for the process. If an integrity measurement of a user space process is different from the expected integrity measurement for the process, then the process has been modified, or compromised.

In accordance with example implementations, the monitoring agent may initiate one or multiple actions to counter potential tampering activity responsive to the state of a user state process, as represented by a heartbeat message, differing from an expected state for the process. Moreover, in accordance with example implementations, the monitoring agent may be alerted to potential tampering with the process monitoring infrastructure and initiate one or multiple actions to counter tampering activity if a particular heartbeat message is missing (e.g., a heartbeat message is not received within an expected time period).

In accordance with example implementations, a heartbeat message may include, among other possible content, a payload portion and an authentication portion. The payload portion contains data that represents a status (e.g., running or stopped) of a monitored user space process, and the authentication portion contains data that represents an authentication code. In an example, the monitoring agent may authenticate a heartbeat message by determining an expected authentication code for the heartbeat message and comparing the expected authentication code to the authentication code that is contained in the heartbeat message. In accordance with example implementations and as further described herein, an expected authentication code matching the heartbeat message's authentication code is an assurance that the integrity of the monitored user space process has not been compromised. Moreover, in accordance with example implementations, an expected authentication code matching the heartbeat message's authentication code is an assurance that the heartbeat message originated with the helper agent and is an assurance that the heartbeat message has not been altered in route.

In accordance with example implementations, for purposes of generating a heartbeat message, the helper agent determines a current status (e.g., running or stopped) of the user space process. The helper agent also measures one or multiple invariant parts (e.g., one or multiple text segments) of a memory space occupied by the user space process to provide a corresponding current integrity measurement for the process. The helper agent then determines an authentication code for the heartbeat message based on the current integrity measurement and the current status. The helper agent incorporates data representing the current status into a payload portion of the heartbeat message, incorporates data representing the authentication code into an authentication portion of the heartbeat message, and sends the heartbeat message to the monitoring agent.

The monitoring agent, in accordance with example implementations, authenticates a particular heartbeat message by determining an expected authentication code for the heartbeat message based on a payload content of the heartbeat message and a reference, or expected, integrity measurement for the user space process. The monitoring agent compares the authentication code that is contained in the heartbeat message to the expected authentication code for purposes of determining whether the authentication passes (the codes are the same) or fails (the codes are different).

The expected integrity measurement for a user space process may be derived in any of a number of different ways, depending on the particular implementation. In an example, as part of a registration, or set up, phase of the process monitoring, the helper agent may measure the user space process, derive the expected integrity measurement and provide the expected integrity measurement to the monitoring agent.

More specifically, in accordance with example implementations, the helper agent may measure one or multiple invariant parts of the memory space occupied by the user space process (to provide the expected integrity measurement) under conditions for which it is unlikely that either the user space process or the helper agent has been subject to tampering. For example, the computer platform may undergo a secure and measured boot, which results in an initial, trusted environment for the computer platform in which the helper agent and user space process have been loaded and started. Accordingly, for this initial, trusted environment, it may be assumed that no tampering has occurred with the helper agent or the user space process.

In an example, at the conclusion of a secure and measured boot, the helper agent is loaded, the user space process is loaded, and the monitoring agent sends a registration request to the helper agent to register the user space process for status monitoring. Responsive to a registration request, the helper agent measures one or multiple invariant parts of the memory space occupied by the user space process to derive an expected integrity measurement for the user space process. Moreover, the helper agent sends, to the monitoring agent, an authenticable registration request response message that includes payload data that represents the expected integrity measurement.

In another example, an expected integrity measurement may be pre-measured (before runtime) from one or multiple invariant parts of an executable file that corresponds to the user space process. In an example, the expected integrity measurement may be pushed to the monitoring agent. In a more specific example, an integrity measurement manifest file that contains expected integrity measurements for respective user space processes to be monitored by the monitoring agent may be pushed to the monitoring agent as part of the monitoring agent's initialization.

Referring to FIG. 1, as a more specific example, in accordance with some implementations, a computer platform 100 may have include one or multiple hardware processors 110 (e.g., one or multiple central processing unit (CPU) processing cores, one or multiple CPU packages, one or multiple graphic processing unit (GPU) processing cores, one or multiple GPU packages, and/or other processors); and a system memory 114. The system memory 114 and other memories discussed herein are non-transitory storage media that may be formed from semiconductor storage devices, memristor-based storage devices, magnetic storage devices, phase change memory devices, a combination of devices of one or more of these storage technologies, and so forth. The system memory 114 may represent a collection of volatile memory devices and non-volatile memory devices, in accordance with example implementations.

In accordance with example implementations, the memory locations of the system memory 114 include locations that correspond to a user space 115 and locations that correspond to a kernel space 117. The "kernel space," as used herein, refers to the memory space of the computer platform 100 in which instructions, or code, corresponding to a kernel 104 (also called an "operating system kernel 104" herein) of an operating system is stored and executes. A LINUX kernel and a WINDOWS NT kernel are examples of operating system kernels. "User space," as used herein, refers to the memory space of the computer platform 100, which is used by non-operating system kernel processes (or "user space processes"), such as processes that correspond to applications 103. The kernel space 117 has the highest privilege level and cannot be accessed by user space processes. Kernel processes can access both the kernel space 117 and the user space 115.

One or multiple of the user space processes may have their states monitored by a process monitoring infrastructure of the computer platform 100, and as such, the processes may be referred to as "monitored user space processes 108" (also referred to herein as "user space processes 108" or "processes 108"). In this context, a "process" refers to an instance of an executing program. A user space process 108 may, for example, correspond to an instance of an application 103. A given process may be single-threaded (i.e., correspond to a single thread) or multithreaded (i.e., correspond to multiple threads), where a "thread" refers to a unit of executable program instructions. For example, multiple threads may be executed in parallel by multiple processing cores of the computer platform 100 to perform a particular task or set of tasks for the computer platform 100.

In an example, a particular monitored user space process 108 may provide a security service for the computer platform 100. In examples, the security service may be related to detecting a security attack on the computer platform 100, inhibiting or preventing a security attack, mitigating harm caused by a security attack, or removing malware. In this context, "malware" generally refers to any software that is constructed with the purpose to intentionally damage a computer system (e.g., a single computer platform or a network of computer platforms) and/or extract information from the computer system. Malware exists in a number of different forms, such as viruses, ransomware, worms, Trojan horses, and other forms.

The architecture that is depicted in FIG. 1 is just one example of a number of different potential architectures for the computer platform 100, in accordance with the many possible implementations. In general, regardless of its particular architecture, a "computer platform" refers to a processor-based electronic device, which has an operating system that has an associated kernel space and user space. As examples, the computer platform 100 may be a standalone server; a rack-mounted server module; an edge processing system; a rack-mounted module; a blade server; a chassis management controller; a client; a thin client; a desktop computer; a portable computer; a laptop computer; a notebook computer; a tablet computer; a smartphone; a network switch; a gateway device; a wearable computer; or another processor-based electronic device.

In accordance with example implementations, a process monitoring infrastructure of the computer platform 100 includes an operating system kernel-based helper agent 106 (called a "helper agent 106" herein), which may monitor one or multiple user space processes 108 for purposes of tracking and reporting the states of the processes 108. The state of a user space process 108 may include a status of the process 108. In the context that is used herein, the "status" of a user space process refers to one or multiple characteristics of the process, which may be observed by an operating system kernel. In an example, the status of a user space process 108 may indicate whether the process 108 is running. In another example, the status of a user process may indicate whether the process 108 has stopped. In another example, the status of a user space process 108 may indicate whether the process 108 is in an uninterruptible sleep state. In another example, the status of a user space process 108 may be an indication of whether the process 108 is in an interruptible sleep state. In another example, the status of a user state process 108 may indicate whether the user space process 108 is a zombie. In another example, the status of a user space process 108 may indicate a start time of the process 108.

In the following description, it is assumed that an expected status of a monitored user space process 108 is that the process 108 is running, and it is assumed that a status that indicates that the process 108 has stopped is indicative of tampering activity. However, in accordance with further implementations, the expected status for a particular monitored user space process 108 may be a status other than a running status or may be a particular multidimensional status (e.g., a running status and a particular process start time).

In accordance with example implementations, the helper agent 106 may be an extension of the operating system kernel 104. In an example, helper agent code 134 may correspond to the helper agent 106. In an example, for a LINUX operating system, the helper agent code 134 may correspond to a loadable kernel module (LKM) that is loaded on demand each time the kernel 104 boots, and after the LKM is loaded, the LKM becomes part of the operating system kernel 104. In another example, the helper agent 106 may be a kernel driver. In another example, for a LINUX operating system, the helper agent 106 may be may be added to the operating system kernel 104 as an eBPF module. An eBPF module is a program that is outside of the compiled LINUX core and runs in a sandbox in a privileged context inside the LINUX kernel. Although initially, the acronym "eBPF" referred to an "extended Berkeley Packet Filter," the term "eBPF" is a standalone term that encompasses privileged context and sandboxed programs other than programs that perform packet filtering.

In accordance with example implementations, the helper agent 106 generates heartbeat messages 107 for one or multiple user space processes 108. In accordance with example implementations, each heartbeat message 107 contains payload content that represents the status (e.g., running or stopped) of a user space process 108. The process monitoring infrastructure of the computer platform 100 also includes an integrity measurement-based heartbeat message authentication and monitoring agent 172 (herein called the "monitoring agent 172"). The monitoring agent 172 processes the heartbeat messages 107 for purposes of evaluating whether a particular monitored user space process 108 has an unexpected state and if so, initiating the appropriate responsive action(s). The helper agent 106, for a particular user space process 108, generates a time series of heartbeat messages 107 in accordance with a predictable timing. The predictable timing serves as a reference to the monitoring agent 172 to alert the monitoring agent 172 to tampering if a particular heartbeat message 107 is not received by the monitoring agent 172 within an expected time period.

The helper agent 106 and the monitoring agent 172 may communicate in in any of a number of different ways. In an example, the helper agent 106 communicates with the monitoring agent 172 using a memory segment (e.g., a memory segment of the system memory 114) that is shared between the helper agent 106 and the monitoring agent 172. In another example, the helper agent 106 may communicate with the monitoring agent 172 using a network protocol via a socket of the kernel 104. For example, the socket may be a stream socket, and communications may occur via a network connection between the helper agent 106 and the monitoring agent 172. In another example, the socket may be a datagram socket, and communications may be connectionless. In another example, the helper agent 106 may communicate with the monitoring agent 172 via a management protocol socket interface of the kernel 104. For example, the helper agent 106 may communicate with the monitoring agent 172 via a Management Component Transport Protocol (MCTP) socket of the kernel 104.

The heartbeat message communication may be protected by authenticated encryption, in accordance with some implementations. Authenticated encryption has the benefits of assuring message confidentiality and authenticity. In an example, as part of a setup, or registration, phase, the monitoring agent 172 may provide the helper agent 106 with a session key (e.g., a randomly-generated cryptographic key or a pseudorandomly-generated cryptographic key), and communications between the monitoring agent 172 and the helper agent 106 may be cryptographically-wrapped by the session key. In an example, the authenticated encryption may use an Advanced Encryption Standard-Galois Counter Mode (AES-GCM) algorithm. In another example, the authenticated encryption may use an AES-GCM-SIV algorithm, which is the AES-GCM algorithm used with a synthetic initialization vector (SIV).

Heartbeat messages may be communicated between the helper agent 106 and the monitoring agent 172 using either a push-based heartbeat message communication model or a pull-based heartbeat message communication model, depending on the particular implementation. In an example of a push-based heartbeat message communication model, the helper agent 106 may push heartbeat messages 107 to the monitoring agent 172 at times that correspond to a particular schedule, without being prompted to do so by the monitoring agent 172. The monitoring agent 172 may, based on the schedule, detect when a heartbeat message 107 is missing, and the missing heartbeat message detection may alert the monitoring agent 172 to potential tampering activity with the process monitoring infrastructure (e.g., tampering with the helper agent 106). In an example, the schedule may be a periodic schedule. In another example, the scheduled times may not strictly comply with a periodic schedule (e.g., the schedule period may vary with the time of day or activity level of the computer platform). Regardless of the type of schedule, the monitoring agent 172 expects a given heartbeat message 107 within a certain time period. In an example, for a periodic schedule, the monitoring agent 172 may expect the next heartbeat message 107 within a certain time period (e.g., the period of the periodic schedule with possibly a margin time) after the last heartbeat message 107. Accordingly, the monitoring agent 172 may be alerted to the absence of a heartbeat message 107 if the monitoring agent 172 does not receive a heartbeat message 107 within the expected time period.

In an example of a pull-based heartbeat message communication model, the monitoring agent 172 may take an action to initiate the helper agent's generation and sending of each heartbeat message 107. In an example, the monitoring agent 172, for each heartbeat message 107, may send a request message to the helper agent 106 requesting the heartbeat message 107, and the monitoring agent 172 may expect to receive the heartbeat message 107 within an expected time period measured from some event corresponding to the request message. In an example, the monitoring agent 172 may measure the expected time period from the time that the monitoring agent 172 sends the corresponding request message. In another example, the monitoring agent 172 may measure the expected time period from the time that the helper agent 106 acknowledges the corresponding request message (for implementations in which the request messages are acknowledged). In another example, the monitoring agent 172 may determine that a particular heartbeat message 107 is missing responsive to the monitoring agent 172 not receiving an acknowledgement of the request message within an expected time period.

In the context that is used herein, the monitoring agent 172 "receiving" a heartbeat message 107 refers to the monitoring agent 172 accessing a heartbeat message 107 that was generated by the helper agent 106, regardless of whether a push-based or pull-based heartbeat message communication model is used and regardless of how the heartbeat message 107 is communicated between the helper agent 106 and the monitoring agent 172.

In accordance with example implementations, a heartbeat message 107 contains an authentication code 111. The monitoring agent 172 may authenticate a given heartbeat message 107 based on payload content of the heartbeat message 107, an expected integrity measurement for the corresponding monitored user space process 108, and an authentication code 111 of the heartbeat message 107. A heartbeat message 107 passing authentication, in accordance with example implementations, is an assurance that the monitoring agent 172 can rely on the heartbeat message 107 as a source for the status of the monitored user space process 108. Moreover, in accordance with example implementations, a heartbeat message 107 passing authentication is an assurance that the integrity of the monitored user space process 108 has not been altered, is an assurance that the heartbeat message 107 originated with the helper agent 106, and is an assurance that the heartbeat message 107 has not been altered in route.

In accordance with example implementations, the monitoring agent 172 may initiate one or multiple responsive actions in response to any of the following events: a heartbeat message 107 failing authentication, a missing heartbeat message 107 or an authenticated heartbeat message 107 representing that the user space process 108 has an unexpected status (e.g., the heartbeat message 107 representing that the process 108 has stopped when the process 108 is supposed to be running). The particular responsive action(s) that are initiated by the monitoring agent 172 may depend on a type, or category, of the particular event (e.g., depend on whether the event corresponds to a failed heartbeat message 107 authentication, a missing heartbeat message 107 or an unexpected process status).

A "responsive action," in the context that is used herein, refers to a measure to counter actual or potential tampering activity. In an example, a responsive action may include powering down the computer platform 100. In another example, a responsive action may include rebooting the computer platform 100. In another example, a responsive action may include generating data for purposes of displaying an alert. In another example, a responsive action may include sending an alert message to a system administrator. In another example, a responsive action may include sending an alert message to a remote management server 194. In another example, a responsive action may include imposing a restriction that a certain password, key or other credential (e.g., a credential supplied by a system administrator) is to be provided before the computer platform 100 is allowed to reboot. In another example, a responsive action may include quarantining the computer platform 100 from an external network. In another example, a responsive action may include quiescing operations of the computer platform 100 associated with an external entity. In accordance with some implementations, the monitoring agent 172 may select one or multiple responsive action(s) for initiation based on a predefined policy that defines responsive actions and criteria for triggering the responsive actions.

In accordance with some implementations, the monitored user space process(es) 108 and the helper agent 106 are part of a target execution environment, and the monitoring agent 172 is part of monitoring execution environment that is separate from the target execution environment. In this context, an "execution environment" refers to a collection of one or multiple components that support execution of one or multiple software components.

In an example, the monitoring agent 172 may be provided by an actual, or physical, hardware component of the computer platform 100, which is not under control of the operating system kernel 104 and therefore, is not part of the target execution environment. In an example and as depicted in FIG. 1, the hardware component providing the monitoring agent 172 may be provided by a peripheral device 159 of the computer platform 100, which is coupled to the helper agent 106 via one or multiple interconnects. In an example, the peripheral device 159 may be solely dedicated to performing the functions of the monitoring agent 172, which are described herein. In another example and as further described herein, the peripheral device 159 may perform process monitoring-related functions of the monitoring agent 172, as well as other functions unrelated to process monitoring.

In the context that is used herein, an "interconnect" refers to communication fabric that connects physical components together. In an example, an interconnect may include one or multiple buses (e.g., a system bus, a Peripheral Component Interconnect Express (PCIe) bus, a System Management Bus (SMB), or other bus). In another example, an interconnect may include one or multiple bridges (e.g., one or multiple input/output (I/O) bridges 118, such as a platform controller hub (PCH)). In the context that is used herein, a hardware component, such as the peripheral device 159, being connected to the helper agent 106, in the context that is used herein, refers to the hardware component being connected to one or multiple hardware processors (e.g., one or multiple hardware processors 110) that execute machine-executable instructions (e.g., instructions corresponding to the operating system kernel 104) that correspond to the helper agent 106.

As depicted in FIG. 1, in accordance with example implementations, the peripheral device 159 may be a management controller of the computer platform 100, such as a baseboard management controller 170. In other examples, the peripheral device 159 may be a hardware component of the computer platform 100, other than a baseboard management controller. For example, the peripheral device 159 may be a management engine that runs a microkernel operating system. In another example, the peripheral device 159 may be a graphics processing unit (GPU). In another example, the peripheral device 159 may be a network interface controller (NIC) 113.

In another example, the peripheral device 159 may be a smart I/O peripheral device 119 of the computer platform 100. In the context that is used herein, a "smart I/O peripheral device" refers to a component of a computer platform, which provides one or multiple functions for a host of the computer platform, which, in legacy architectures have been controlled by the host. A smart I/O peripheral may be also be referred to as a "data processing unit," or "DPU." In general, a smart I/O peripheral device is a hardware processing unit that has been assigned (e.g., programmed with) a certain personality. The smart I/O peripheral device may provide one or multiple backend I/O services (or "host offloaded services) in accordance with its personality. The backend I/O services may be non-transparent services (e.g., hypervisor virtual switch offloading services) or transparent services (encryption services, overlay network access services and firewall-based network protection services). In an example, one or multiple hardware processors of the smart I/O peripheral 119 may execute machine-readable instructions to provide the monitoring agent 172.

In accordance with further implementations, the monitoring agent 172 may be provided by a virtual component of the computer platform 100, which is part of an execution environment that is separate from the target execution environment. In examples, the monitoring agent 172 may be provided by a virtual machine. In another example, the monitoring agent 172 may be provided by virtual baseboard management controller. In another example, the monitoring agent 172 may be provided by a container, a container pod or a cluster of container pods. The virtual component that provides the monitoring agent 172 may or may not be solely dedicated to performing status monitoring functions for the monitoring agent 172.

In another example and as further described below in connection with FIG. 5, the process monitoring infrastructure may be a distributed system. In this manner, the monitoring agent 172 may be provided by a virtual or physical component that resides on a computer platform other than the computer platform 100.

For the example implementation that is depicted in FIG. 1, the monitoring agent 172 is provided by the baseboard management controller 170. In an example, the baseboard management controller 170 may be an embedded system that is mounted to a motherboard of the computer platform 100. In accordance with example implementations, the baseboard management controller 170 may contain one or multiple semiconductor packages (or "chips") and one or multiple semiconductor die. In accordance with further implementations, the baseboard management controller 170 may be an expansion card that is connected to a connector slot that is located on a motherboard of the computer platform 100. The baseboard management controller 170 may not contain semiconductor package(s) mounted to the motherboard and may not be associated with an expansion card, in accordance with further implementations.

Regardless of its particular form or implementation, the baseboard management controller 170, in general, may include one or multiple general purpose embedded processing cores 154 (e.g., CPU processing cores), which may execute machine-readable instructions 156 that are stored in a memory 155 of the baseboard management controller to provide the monitoring agent 172. In accordance with further implementations, the baseboard management controller 170 may provide the monitoring agent 172 using dedicated hardware of the baseboard management controller 170, which does not execute readable machine-readable instructions. In examples, the dedicated hardware may be a field programmable gate array (FPGA), an application specific integrated circuit (ASIC), a programmable logic device (PLD), or another electronic device. In accordance with further implementations, the baseboard management controller 170 may provide the monitoring agent 172 using a combination of dedicated hardware and hardware that executes machine-readable instructions.

In the context that is used herein, a "baseboard management controller" is a specialized service processor that monitors the physical state of a computer platform or other hardware using sensors and communicates with a management system through a management network. The baseboard management controller 170 may communicate with applications executing at the operating system level through an input/output controller (IOCTL) interface driver, a representational state transfer (REST) application program interface (API), or some other system software proxy that facilitates communication between the baseboard management controller and applications. The baseboard management controller 170 may have hardware level access to hardware devices of the computer platform, including system memory. The baseboard management controller 170 may be able to directly modify the hardware devices. The baseboard management controller 170 may operate independently of the operating system of the computer platform 100. The baseboard management controller 170 may be located on the motherboard or main circuit board of the computer platform 100. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. As such, the baseboard management controller 170 is separate from the hardware processor(s) 110, which execute instructions corresponding to the operating system kernel 104.

In accordance with example implementations, the baseboard management controller 170 has a management plane and a separate, security plane. Through its management plane, the baseboard management controller 170 may provide various management services for the computer platform 100. In addition to actions or functions that are described herein pertaining to the monitoring agent 172, the baseboard management controller 170 may perform various other management services unrelated to process monitoring. These management services may include, as examples, monitoring sensors (e.g., temperature sensors, cooling fan speed sensors); monitoring operating system status; monitoring power statuses; logging computer platform 100 events; providing the capability to mount virtual media; providing the capability to boot the computer platform 100 from virtual media; providing remotely-controlled management functions for the computer platform 100; and other management services.

Through its security plane, the baseboard management controller 170, in accordance with example implementations, provides security functions, or services, for the computer platform 100, such as key management (e.g., functions relating to storing and loading cryptographic keys), firmware image validation, platform cryptographic identity retrieval, measurement hash loading, measurement hash retrieval; and other security services. In accordance with example implementations, as part of its security plane, the baseboard management controller 170 may validate and load firmware instructions from a firmware 176 stored in a non-volatile memory 184 (e.g., a flash memory) of the computer platform 100. The firmware 176 may include machine-readable instructions corresponding to a management stack of the baseboard management controller 170, and the firmware 176 may include code 177 that is executed by one or multiple processing cores 154 to provide the monitoring agent 172. As depicted in FIG. 1, the baseboard management controller 170 may be coupled to the non-volatile memory 184 through via a bus 183 (e.g., a Serial Peripheral Interface (SPI) bus or other bus).

Among its other features, the computer platform 100 may include one or multiple I/O bridges 118; one or multiple mass storage devices 130; one or multiple network interface cards (NICs) 113; a trusted platform module (TPM) 188; I/O devices (e.g., a keyboard, mouse, a trackpad, a display, and so forth); and other electronic devices.

The baseboard management controller 170, the NIC(s) 113, the TPM 188 and the processors 110 may, in accordance with example implementations, communicate through the I/O bridge(s) 118; and the storage device(s) 130 may be coupled to the processors 110 through the I/O bridge(s) 118. As depicted in FIG. 1, in accordance with some implementations, the storage device(s) 130 may store an operating system image 132 (corresponding to the operating system kernel 104), operating system bootloader code (corresponding to an operating system bootloader), helper agent code 134 (corresponding to the helper agent 106); and application code 136 (corresponding to applications 103). For the example implementation of FIG. 1, a NIC 113 couples the I/O bridge(s) 118 to network fabric 190 for purposes of allowing the baseboard management controller 170 to communicate with a management network, including communicating with the depicted remote management server 194. In accordance with further example implementations, the baseboard management controller 170 may contain a network interface controller that communicates with the network fabric 190.

In general, the network fabric 190 may be associated with one or multiple types of communication networks, such as (as examples) Fibre Channel networks, Compute Express Link (CXL) fabric, dedicated management networks, local area networks (LANs), WANs, global networks, wireless networks, or any combination thereof.

The TPM 188 is an example of a security processor of the computer platform 100, which, among other functions, may be used to provide cryptographic services for the computer platform 100 and securely store cryptographic artifacts (e.g., the secure boot variables, hashes to verify integrity measurement, keys, and so forth) for the computer platform 100. In an example, the TPM 188 may be a physical hardware component that is mounted to a motherboard of the computer platform 100. In another example, the TPM 188 may be a virtual TPM (vTPM). In another example, the TPM 188 may be a firmware TPM (fTPM). In accordance with further implementations, the computer platform 100 may not include a TPM.

In accordance with some implementations, the TPM 188 may be constructed to perform one or multiple trusted computing operations that are described in the Trusted Platform Module Library Specification, Family 2.0, Level 00, Revision 01.59 (November 2019), published by the Trusted Computing Group (hereinafter called the "TPM 2.0 Specification"). In accordance with further implementations, the TPM 188 may perform one or multiple trusted computing operations that are not described in the TPM 2.0 Specification. In accordance with further example implementations, the computer platform 100 may contain a security component other than a TPM. In accordance with further implementations, the computer platform 100 may not have a TPM or other security processor. In accordance with further implementations, the computer platform 100 may have a TPM 188 or other security processor but not use the TPM 188/security processor.

In accordance with example implementations, the TPM 188 may include one or multiple components that may be used by the helper agent 106 and/or monitoring agent 172 to assist in cryptographic processing-related operations that are used in communications between the helper agent 106 and monitoring agent 172, as further described herein. In an example, the TPM 188 may include a random number generator that, via an application programming interface (API) call, may generate and return a random number as a response to the API call. The random number generator may generate the random number from an input that is provided by an entropy source. In an example, the random number generator may be a digital random number generator module that is described in Part 1, Section 11.4.11 of the TPM 2.0 Specification. In another example, the TPM 188 may include a keyed-hashing engine that performs a keyed-hash algorithm to generate a hash, or digest, based on a message input and a cryptographic key input. In an example, via an API call that passes a cryptographic key (e.g., via a key handle) and a message input, the keyed-hash generator generates a digest that is returned as a response to the API call. In an example, the keyed-hash generator may apply a keyed-hashing algorithm that is described in Part I, Section 11.4.4 of the TPM 2.0 Specification. In another example, the TPM 188 may include a hashing engine that applies a cryptographic hash algorithm to an input that may be provided by an API call.

Figure 2:
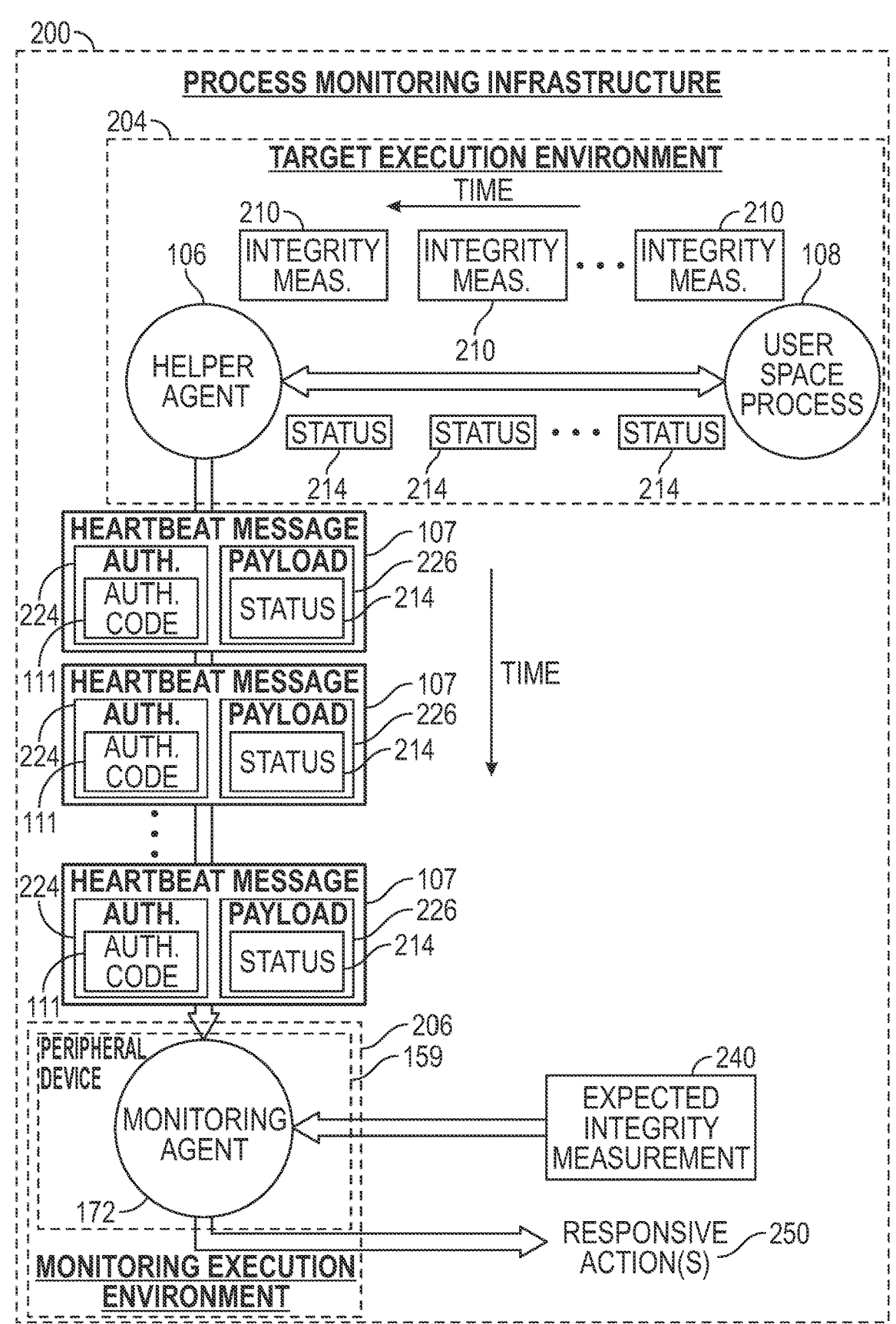
FIG. 2 is a block diagram of a process monitoring infrastructure according to an example implementation.

FIG. 2 depicts a process monitoring infrastructure 200 in a runtime phase, in accordance with example implementations. Referring to FIG. 2, the process monitoring infrastructure 200 is associated with a target execution environment 204. The target execution environment 204 includes a kernel-based helper agent 106 of the process monitoring infrastructure, and the target execution environment 204 includes a monitored user space process 108. Moreover, for the example implementation that is depicted in FIG. 2, the process monitoring infrastructure 200 is further associated with a monitoring execution environment 206 that includes a peripheral device 159, which provides a monitoring agent 172 of the infrastructure 200.

As depicted in FIG. 2, the helper agent 106 samples a status 214 (e.g., a running or stopped status) of the user space process 108 at different times. For each status 214, the helper agent 106 measures one or multiple invariant parts of a memory space occupied by the user space process 108 to derive a corresponding integrity measurement 210. The helper agent 106 generates each heartbeat message 107 based on a status 214 and an integrity measurement 210 and sends the heartbeat message 107 to the monitoring agent 172 according to a particular schedule (for push-based heartbeat message communication) or in response to a request for the heartbeat message 107 (for pull-based heartbeat message communication). "Sending" a heartbeat message 107 to the monitoring agent 172, in this context, refers to the helper agent 106 taking one or multiple actions (e.g., storing data representing the heartbeat message 107 in a memory location shared with the monitoring agent 172 or sending the heartbeat message 107 via a socket) that allow the heartbeat message 107 to be accessed by the monitoring agent 172.

In accordance with example implementations, the helper agent 106 determines the authentication code 111 for a heartbeat message 107 based on a status 214 and an integrity measurement 210. More specifically, as further described herein, the helper agent 106 may determine the authentication code 111 by first determining, based on the status 214 and the integrity measurement 210, a cryptographic key input and a message input. Next, the helper agent 106 applies a keyed-hash algorithm to the cryptographic key input and the message key input to derive the authentication code 111, which is an output of the keyed-hash algorithm. As depicted in FIG. 2, the heartbeat message 107 includes an authentication portion 224 that contains data representing the authentication code 111, and the heartbeat message 107 includes a payload portion 226 that contains data representing the status 214.

The monitoring agent 172 processes each received heartbeat message 107 for purposes of determining whether the state of the user space process 108, as represented by the heartbeat message 107, corresponds to an expected state for the process 108. In accordance with example implementations, the processing of a heartbeat message 107 by the monitoring agent 172 includes the monitoring agent 172 first determining whether the heartbeat message 107 can be relied on as a source for the status of the user space process 108. For this purpose, in accordance with example implementations, the monitoring agent 172 determines an expected authentication code for the heartbeat message 107 and compares the expected authentication code to the authentication code 111 represented by the heartbeat message 107. Based on this comparison, the monitoring agent 172 may determine whether the heartbeat message 107 passes authentication (the authentication codes are the same) or fails authentication (the authentication codes are different). A heartbeat message 107 passing authentication means that the integrity of the user space process 108 has not been compromised and further means that the monitoring agent 172 may rely on the status 214 represented by the heartbeat message 107. Therefore, in accordance with example implementations, if the heartbeat message 107 passes authentication and the status 214 corresponds to an expected status (e.g., the process 108 is running), then the state of the user space process 108, as represented by the heartbeat message 107, corresponds to the expected state.

If a heartbeat message 107 fails authentication, then the monitoring agent 172 may initiate one or multiple responsive actions 250 to counter potential tampering with the process monitoring infrastructure 200 (e.g., potential tampering with the helper agent 106). Moreover, if a heartbeat message 107 passes authentication but the status 214 represents an unexpected state (e.g., a stopped state) for the user space process 108, then the monitoring agent 172 may initiate one or multiple responsive actions 250 to counter potential tampering with the user space process 108. The monitoring agent 172 may also initiate one or multiple responsive actions 250 in response to an unexpected interruption of the heartbeat messages 107 (e.g., a heartbeat message was not received within an expected time period) to counter potential tampering with the process monitoring infrastructure 200.

Figure 3A:
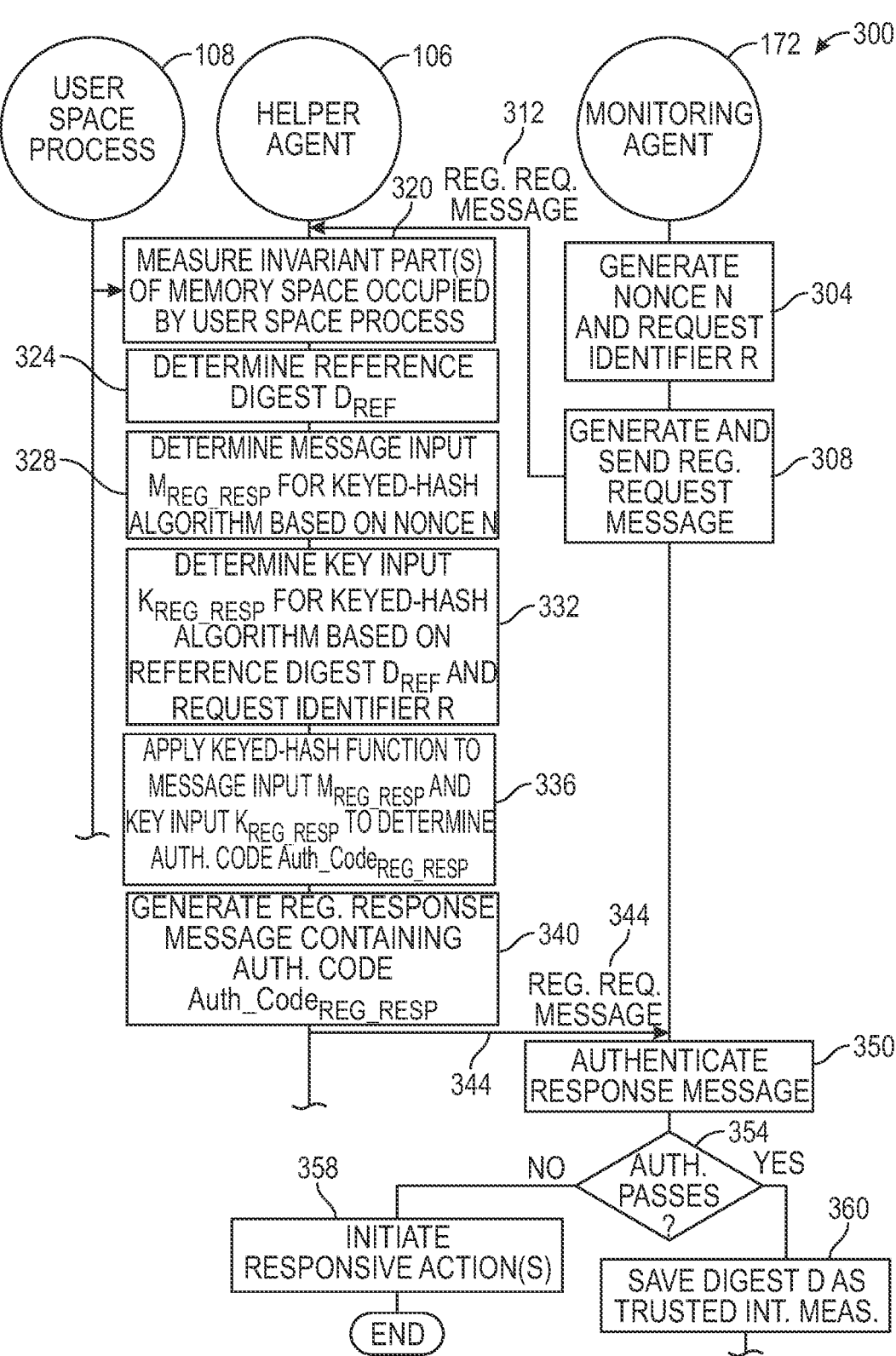
FIGS. 3A and 3B are sequence flow diagrams depicting communications and actions associated with a monitoring agent and a kernel-based helper agent to set up a process monitoring infrastructure to monitor a user space process according to example implementations.
Figure 3B:
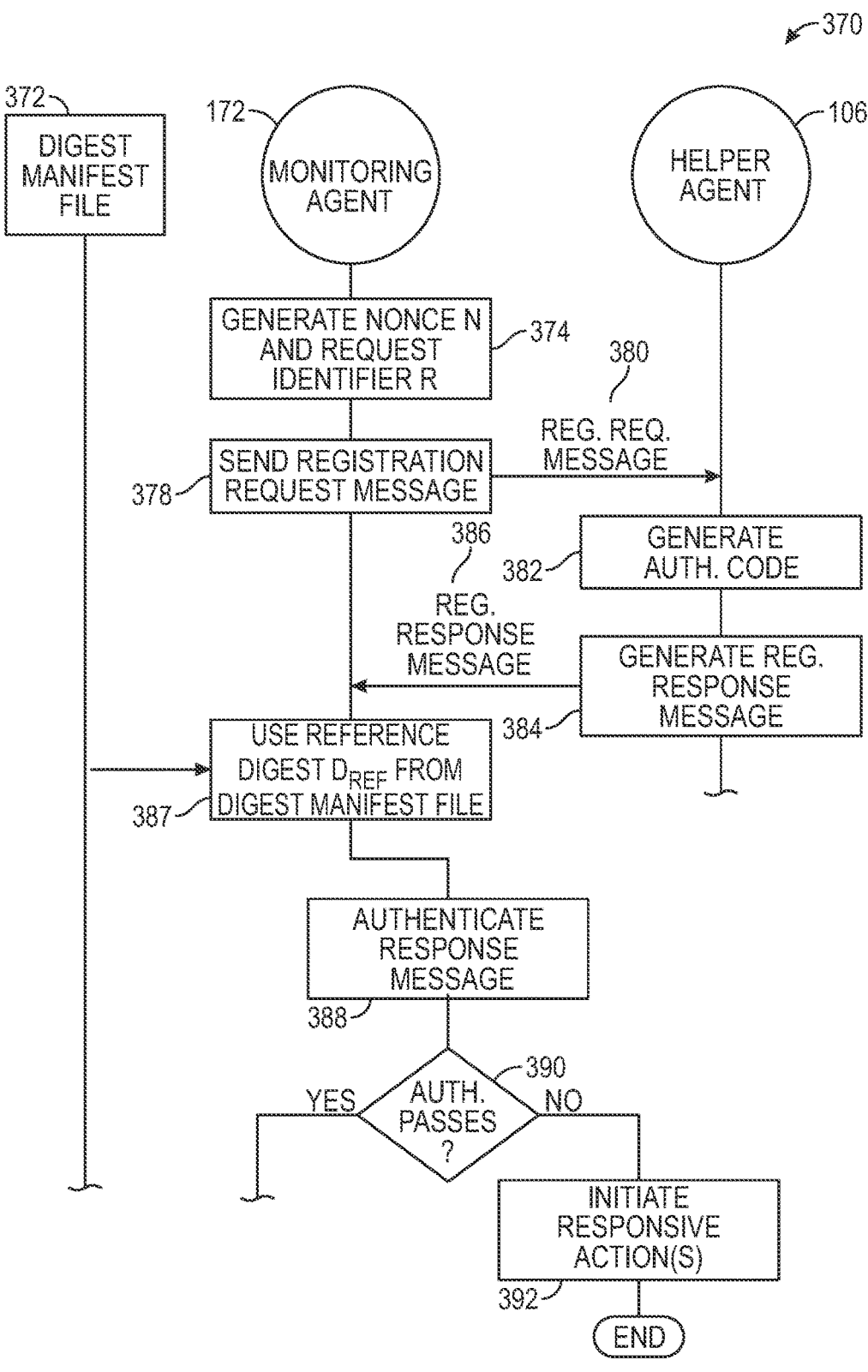

FIG. 3A depicts a sequence 300 of actions and communications associated with a process monitoring registration phase, in accordance with example implementations. In the sequence 300, the helper agent 106 acquires an expected integrity measurement for a particular to-be-monitored user space process 108 and provides the expected integrity measurement to the monitoring agent 172. FIG. 3B, which as described further herein, depicts an alternative sequence 370, in which the monitoring agent 172 receives the expected integrity measurement from a source other than the helper agent 106.

Referring to FIG. 3A, the helper agent 106 may be used to derive the expected integrity measurement for a user space process 108 under conditions for which it is unlikely that either the user space process 108 or the helper agent 106 has been subject to tampering. For example, such conditions may be assumed after the computer platform has undergone a secure and measured boot and has just transitioned out of the pre-boot environment into the runtime environment. The process status monitoring registration phase begins with the monitoring agent 172 preparing and sending a registration request message 312 to the helper agent 106. To generate the registration request message 312, the monitoring agent 172 first, as depicted at 304, generates a nonce (called the "nonce N" herein) and a request identifier (called the "request identifier R" herein). The request identifier R and the nonce N, in accordance with example implementations, are randomly-generated or pseudorandomly-generated bit sequences of respective predetermined bit lengths. In an example, the bit length of the nonce N may be different from the bit length of the request identifier R. In another example, the bit length of the nonce N may be the same as the bit length of the request identifier R. The nonce N introduces a degree of randomness, or unpredictability, to payload portions of messages (e.g., heartbeat messages) that are communicated between the helper agent 106 and the monitoring agent 172. The combination of the nonce N and the request identifier R, as further described herein, introduces a degree of randomness, or unpredictability, to authentication codes that are added to messages (e.g., heartbeat messages) that are communicated between the helper agent 106 and the monitoring agent 172.

In accordance with some implementations, the monitoring agent 172 uses a security processor, such as the TPM 188 of FIG. 1, to generate the nonce N and the request identifier R. In an example, the monitoring agent 172 may, via API calls to the security processor, use a random number generator or the security processor to return random numbers corresponding to the nonce N and the request identifier R. In another example, the monitoring agent 172 may determine the nonce N and the request identifier R through the execution of random number/pseudorandom number machine-readable instructions. In another example, the monitoring agent 172 may use a security processor of a baseboard management controller, such as the baseboard management controller 170 of FIG. 1, to generate the nonce N and the request identifier R. In another example, the monitoring agent 172 may use a cryptographic processor, other than a security processor, to generate the nonce N and the request identifier R. In another example, the monitoring agent 172 may generate the nonce N and the request identifier R using a random number generator or a pseudorandom number generator that is not part of a security processor, baseboard management controller or cryptographic processor.

As depicted at 308, the monitoring agent 172 sends the registration request message 312 to the helper agent 106. In addition to the nonce N and the request identifier R, the registration request message 312 may contain additional information. In an example of the additional information, the registration request message 312 may contain configuration and operational parameters. In another example of the additional information, the registration request message 312 may contain data (e.g., a process identifier (PID)) that allows the helper agent 106 to identify the user space process 108 to be monitored.

The helper agent 106, in accordance with example implementations, measures the user space process 108. More specifically, running in kernel context, the helper agent 106 has access to the memory mappings of the user space process 108. These mappings, in turn, allow the helper agent 106 to identify one or multiple invariant parts of memory space occupied by the user space process 108. In this context, an "invariant part" of the memory space occupied by the user space process 108 refers to a portion of in-memory content corresponding to the user space process 108 and which does not change (in the absence of tampering) while the process 108 runs. In an example, an invariant part of the user space process 108 may be a memory text segment associated with the process 108. A "text segment," in this context, refers to a portion of memory that contains time-invariant machine-executable instructions and/or time-invariant variable initializations. In accordance with example implementations, the text segment corresponds to a read-only memory portion. The helper agent 106 measures the identified invariant part(s) of the memory space content occupied by the user space process 108, as depicted at 320, for purposes of deriving, or determining, an expected, or reference, integrity measurement (called the reference digest "$D_{REF}$") for the user space process 108, as depicted at 324.

In accordance with example implementations, the reference digest $D_{REF}$ is a hash of text segment content, as described below in Equation (Eq.) 1:

$$D_{REF} = \text{Hash}(\text{Text Segment Content}), \qquad \text{Eq. 1}$$

where "Hash ( )" represents the application of a cryptographic hash algorithm, and for this particular example, the cryptographic hash algorithm has, as its input, content from one or multiple in-memory text segments corresponding to the user space process 108.

In an example, the reference digest $D_{REF}$ may be derived from integrity measurements of the content M1 to M5 from five respective in-memory text segments. The reference digest $D_{REF}$, for this example, is a cumulative hash, as described below:

$$D_{REF}=H((H(H(H(H(M1)\|M2)\|M3)\|M4))\|M5), \quad \text{Eq. 2}$$

where "H ( )" represents the application of a cryptographic hash algorithm, and "| |" represents a concatenation operator. The reference digest $D_{REF}$ may be derived from hash(es) of content from fewer than five in-memory segments or more than five in-memory text segments, in accordance with further implementations.

In accordance with some implementations, the helper agent 106 derives the reference digest $D_{REF}$ using a security processor, such as the TPM 188 of FIG. 1. In an example, the helper agent 106 may, via an API call to the security processor, pass the text segment content to the security processor and invoke a hashing operation by the security processor's hashing engine. The security processor may then return the corresponding reference digest $D_{REF}$ produced by the hashing operation. In another example, the helper agent 106 may determine the reference digest $D_{REF}$ through the execution of hash generating, machine-readable instructions. In another example, the helper agent 106 may use a security processor of a baseboard management controller, such as the baseboard management controller 170 of FIG. 1, to generate the reference digest $D_{REF}$. In another example, the helper agent 106 may use a cryptographic processor other than a security processor to generate the reference digest $D_{REF}$. In another example, the helper agent 106 may use a hashing engine that is not part of a security processor, cryptographic process or baseboard management controller.

In the context that is used herein, a "hash" (which may also be referred to by such terminology as a "digest," "hash value," or "hash digest") is produced by the application of a cryptographic hash algorithm to an input value. A cryptographic hash algorithm receives an input value, and the cryptographic hash algorithm generates a hexadecimal string (the digest, or hash) to match the input value. In an example, the input value may include a string of data (for example, a data structure in memory denoted by a starting memory address and an ending memory address). In such an example, based on the string of data, the cryptographic hash algorithm outputs a hexadecimal string (the digest, or hash). Any minute change to the input value alters the output hexadecimal string. In examples, the cryptographic hash function may be a secure hash algorithm (SHA), a Federal Information Processing Standards (FIPS)-approved hash algorithm, a National Institute of Standards and Technology (NIST)-approved hash algorithm, or any other cryptographic hash algorithm. In some examples, instead of a hexadecimal format, another format may be used for the string.

In accordance with further implementations, the reference digest $D_{REF}$ may be further based on content other than the text segment content. For example, in accordance with some implementations, the reference digest $D_{REF}$ may be formed from a concatenation of content from a text segment of the user space process 108 and one or multiple non-text segment runtime invariants, as described below:

$$D_{REF}=\text{Hash(Text Segment Content}\|\text{Non-Text Segment Runtime Invariant).} \quad \text{Eq. 3}$$

In an example, a non-text segment runtime invariant may be a process path of the user space process 108. In another example, a non-text segment runtime invariant may be a name of an executable file corresponding to the user space process 108, including passed arguments. In another example, a runtime non-text segment invariant may be an executable version number. Regardless of the particular non-text segment runtime invariant(s) that are used as hash function inputs to derive the reference digest $D_{REF}$, the runtime invariants are expected to be static during the runtime of the user space process 108.

In another example, the helper agent 106 may derive the reference digest $D_{REF}$ from text segment content of the user space process 108 and text segment content from libraries that are dynamically linked by the operating system to the user space process 108. For example, in accordance with some implementations, the helper agent 106 may determine the reference digest $D_{REF}$ based on text content from N libraries, as described below:

$$D_{REF}=\text{Hash(Text Segment Content}\|\text{Library 1 Text}\| \ . \\ . \ . \ \|\text{Library } N \text{ Text)}, \quad \text{Eq.4}$$

where the library text (e.g., "Library 1 Text" or Library N") refers to runtime invariant content of a particular library. In accordance with some implementations, the executable files and libraries associated with the user space process 108 may be compiled as position independent executables (PIE) and position independent code (PIC), respectively, which are loaded at arbitrary memory addresses. This has the benefit of enhancing the difficulty for attackers to correctly exploit execution.

The helper agent 106, in accordance with example implementations, uses the reference digest $D_{REF}$, the nonce N and the request identifier R to determine an authentication code for a registration response message 344. More specifically, in accordance with example implementations, the helper agent 106 uses the reference digest $D_{REF}$, the nonce N and the request identifier R, in conjunction with a keyed-hash algorithm, to generate the authentication code.

In the context that is used herein, a "keyed-hash algorithm" refers to a function that uses a cryptographic hash algorithm (e.g., an SHA, a FIPS-approved hash algorithm, an NIST-approved hash algorithm or other hash algorithm) to generate a digest, or hash, based on a cryptographic key and a message input. The keyed-hash algorithm derives an input for the cryptographic hash algorithm from the cryptographic key and the message input.

The keyed-hash algorithm may derive a digest, or hash, using a single pass or multiple iterations of the cryptographic hash algorithm. In an example, a keyed-hash algorithm may form an input value based on a concatenation of the cryptographic key and the message input, and the keyed-hash algorithm may provide the input value to a cryptographic hash algorithm that provides a digest, which is the output, or result, of the keyed-hash algorithm. In another example, a keyed hash algorithm may form an input value based on a concatenation of a key derived from the cryptographic key and the message input, and the keyed-hash algorithm may provide the input value to a cryptographic hash algorithm that provides a digest, which is the output, or result, of the keyed-hash algorithm. In another example, a hash-based message authentication code (HMAC) keyed-hash algorithm derives a first key (also called "an inner key") and a second key (also called an "outer key") from the cryptographic key. In a first iteration, or pass (also called the "inner pass"), of the HMAC keyed-hash algorithm, the first key and a message input are combined to provide a first input value to a cryptographic hash algorithm, which provides a first digest (also called the "inner digest result"). In a second iteration, or pass (also called the "outer pass"), of the HMAC keyed-hash algorithm, the second key and the first digest are combined to provide a second input value to the cryptographic hash algorithm, which provides a second digest, which is the output, or result, of the HMAC keyed-hash algorithm. The output of the HMAC keyed-hash algorithm may be referred to as an HMAC.

In accordance with example implementations, the helper agent 106 determines, as depicted at 328, a message input (called the "message input $M_{REG\_RESP}$" herein) for the keyed-hash algorithm as described below:

$$M_{REG\_RESP}=N+1. \qquad \text{Eq. 5}$$

In another example, the message input $M_{REG\_RESP}$ may be a combination (e.g., a concatenation) of the nonce N and a status T of the user space process 108. The helper agent 106 generates, as depicted at 332, a cryptographic key input (called the "cryptographic key input $K_{REG\_RESP}$" herein) for the keyed-hash function as follows:

$$K_{REG\_RESP}=K_{DEV}(D_{REF}\|R), \qquad \text{Eq. 6}$$

where "$K_{DEV}(\ )$" represents a key derivation function. As depicted above in Eq. 6, in accordance with example implementations, the cryptographic key input $K_{REG\_RESP}$ is based on the concatenation of the reference digest $D_{REF}$ and the request identifier R. In an example, the key derivation function $K_{DEV}(\ )$ may be one that produces a key of fixed size regardless of the length of the concatenation of the reference digest $D_{REF}$ and the request identifier R. In accordance with example implementations, if the length of the $D_{REF}\|$ R input in bytes is longer than the size of the byte block that the underlying key derivation function operates on, then the $D_{REF}\|$ R input is first hashed.

In accordance with example implementations, the helper agent 106 determines, as depicted at 336, an authorization code (called "Auth_Code$_{REG\_RESP}$" herein) for the registration response message, based on the message input $M_{REG\_RESP}$ and the cryptographic key input $K_{REG\_RESP}$ as described below:

$$\text{Auth\_Code}_{REG\_REP}=\text{Keyed\_Hash}(M_{REG\_REP}, \\ K_{REG\_REP}), \qquad \text{Eq. 7}$$

where "Keyed_Hash ( )" represents a keyed-hash algorithm (e.g., an HMAC algorithm that uses a particular SHA).

In accordance with some implementations, the helper agent 106 uses a security processor, such as the TPM 188 of FIG. 1, to perform the keyed-hash algorithm. In an example, the helper agent 106 may, via an API call to the security processor, pass the message input $M_{REG\_RESP}$ and the cryptographic key input $K_{REG\_RESP}$ (e.g., passed via a key handle) to the security processor and invoke a keyed-hashing operation by a keyed-hashing engine of the security processor. The security processor may then return the authorization code Auth_Code$_{REG\_REP}$ as an output of the keyed-hashing operation. In another example, the helper agent 106 may determine the authorization code Auth_Code$_{REG\_REP}$ through the execution of machine-readable instructions that perform a keyed-hashing algorithm. In another example, the helper agent 106 may use a security processor of a baseboard management controller, such as the baseboard management controller 170 of FIG. 1, to generate the authorization code Auth_Code$_{REG\_REP}$. In another example, the helper agent 106 may use a cryptographic processor other than a security processor to generate the authorization code Auth_Code$_{REG\_REP}$. In another example, the helper agent 106 may use a keyed-hashing engine that is not part of a security processor, cryptographic process or baseboard management controller to generate the authorization code Auth_Code$_{REG\_REP}$.

Regardless of how the authorization code Auth_Code$_{REG\_REP}$ IS generated, the helper agent 106 generates a registration response message 344, as depicted at 340, which results in the registration response message 344 being sent to the monitoring agent 172. The registration response message 344, in accordance with example implementations, includes a payload portion and an authentication portion. The payload portion includes data that represents the reference digest $D_{REF}$. The authentication portion includes data representing the authorization code Auth_Code$_{REG\_REP}$. The monitoring agent 172 receives the registration response message 344 and authenticates the response message, as depicted at 350.

In accordance with example implementations, the monitoring agent 172 authenticates the registration response message 344 by determining an expected authorization code and comparing the expected authorization code to the authorization code contained in the message 344. In an example, the monitoring agent 172 may use its knowledge of the nonce N to calculate an expected message input per Eq. 5, and the monitoring agent 172 may use its knowledge of the request identifier R and the reference digest $D_{REF}$ (as represented by the payload portion of the response message 344) to calculate an expected cryptographic key input per Eq. 6. The monitoring agent 172 may then, for purposes of generating the expected authorization code, provide the expected message input and the expected cryptographic key input to the keyed-hash algorithm that the monitoring agent 172 expected to be applied to generate the authorization code Auth_Code$_{REG\_REP}$. In examples, the keyed-hash algorithm may be performed by any of a number of different entities such as the monitoring agent 172 (e.g., by executing machine-readable keyed-hashing instructions), a security processor, a cryptographic processor, a baseboard management controller, or other entity.

As depicted at 350, the monitoring agent 172 authenticates the registration response message 344 based on a comparison of the expected authorization code to the authorization code Auth_Code$_{REG\_REP}$ contained in the registration request message 344. If the monitoring agent 172 determines (as depicted at 354) that the registration request message 344 passes authorization (e.g., the authorization codes are the same), then a digest D represented by the data of the payload portion of the message represents the expected integrity measurement for the user space process 108, which will be used by the monitoring agent 172 to authenticate heartbeat messages. The monitoring agent 172 therefore saves the digest D, as depicted at 360. If the monitoring agent 172 determines (as depicted at 354) that the registration response message fails authentication, then, in accordance with example implementations, the monitoring agent 172 may initiate one or multiple responsive actions 358, as potential tampering may have occurred.

In accordance with further example implementations, an expected, or reference, integrity measurement for a user space process 108 may be derived without the aid of the helper agent 106. For these implementations, a registration phase that is depicted in a sequence 370 of FIG. 3B may be used, instead of the sequence 300 of FIG. 3A.

Referring to FIG. 3B, in accordance with some implementations, the registration phase includes the monitoring agent 172 sending out a registration request message 380, as depicted at 378. Generating the registration request message 380, in accordance with example implementations, includes the monitoring agent 172 generating, as depicted at 374, a nonce N and request identifier R for the registration request message 380.

In response to the registration request message 380, the helper agent 106 generates a registration response message 386, as depicted at 384. In preparation for the generation of the registration response message 386, the helper agent 106 generates an authorization code for the message 386, as depicted at 382. The helper agent 106 may generate the authorization code using a keyed-hashing algorithm. For this purpose, the helper agent 106 generates an authorization code for the message 386 by applying a keyed hashing algorithm to message input and a cryptographic input, in a similar manner to that described above in Eqs. 5, 6 and 7 above. For the cryptographic key input, the reference $D_{REF}$ digest of Eq. 6 corresponds to a payload content of the registration response message 386. This payload content may be arbitrary, as the monitoring agent 172 does not rely on the registration response message to provide the expected integrity measurement. Instead, the monitoring agent 172 uses an expected integrity measurement that is provided by a digest manifest file 372, as depicted at 387. In an example, the digest manifest file 372 may store data representing an expected integrity measurement (i.e., a reference $D_{REF}$ digest) for the user space process 106, which was derived from a measurement of one or multiple invariant parts of an executable file that corresponds to the user space process 108.

As depicted at 388, the monitoring agent 172 authenticates the registration response message 386. For this purpose, the monitoring agent 172 calculates an expected authorization code using the expected integrity measurement from the digest manifest file 372, and the monitoring agent 172 compares the expected authorization code to the authorization code that is contained in the registration request response message. If the monitoring agent 172 determines (as depicted at 390) that the registration response message passes authentication, then the runtime phase of the heartbeat monitoring may proceed. As depicted at 392, if the monitoring agent 172 determines (as depicted at 390) that the registration response message fails authentication, then the monitoring agent 172 may initiate one or multiple responsive actions, as depicted at 392.

Figure 4:
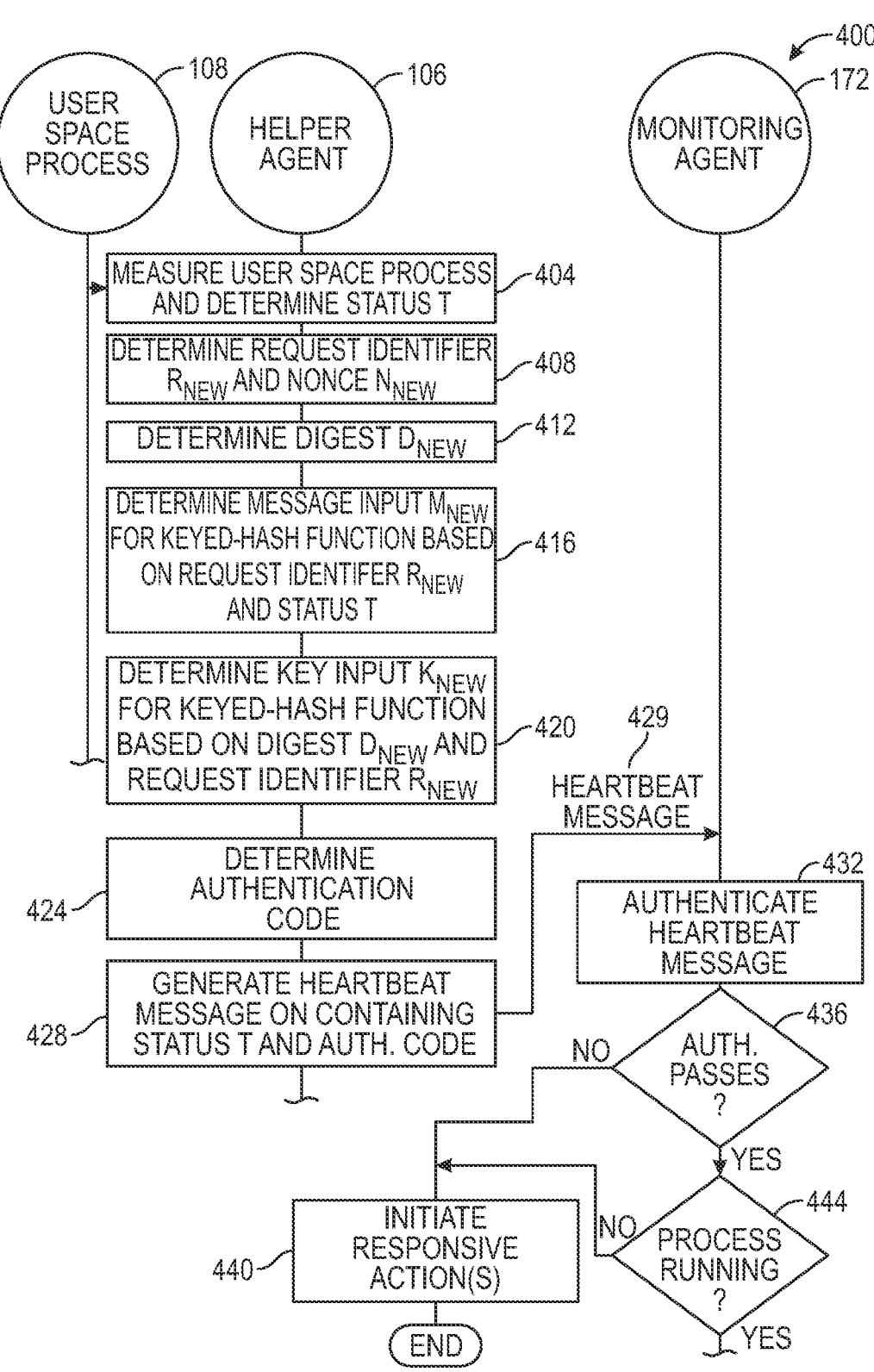
FIG. 4 is a sequence flow diagram depicting communications and actions associated with a monitoring agent and a kernel-based helper agent to use heartbeat message authentication as a mechanism to detect tampering with a monitored user space process according to an example implementation.

FIG. 4 depicts an example flow sequence 400 illustrating the generation, sending, receipt and authentication of a heartbeat message 429 for a particular user space process 108 in accordance with example implementations. Referring to FIG. 4, the flow sequence 400 includes the helper agent 106 performing actions in preparation for the generation of the heartbeat message 429. These actions include the helper agent 106 measuring the user space process 108 and determining a current status T of the user space process 108, as depicted at 404.

As depicted at 408, the helper agent 106 further determines a request identifier and a nonce for the heartbeat message 429, called "$R_{NEW}$" and "$N_{NEW}$," respectively. In accordance with example implementations, the helper agent 106 determines the request identifier $R_{NEW}$ and the nonce $N_{NEW}$ based on a request identifier and a nonce that were sent previously, by the monitoring agent 172, to the helper agent 106. In an example, the helper agent 106 may modify (e.g., apply derivation functions) to a previously-used request identifier and a previously-used nonce to generate the nonce $N_{NEW}$ and response identifier $R_{NEW}$. In another example, for heartbeat messaging using a pull-based communication model, the monitoring agent 172 may, in each heartbeat message request, generate and send the nonce $N_{NEW}$ and the request identifier $R_{NEW}$.

As depicted at 412, the helper agent 106 determines, from the integrity measurement of the user space process 108, a digest $D_{NEW}$, which is an integrity measurement of the user space process 108. If no tampering with the user space process 108 has occurred, then the digest $D_{NEW}$ should be the same as the expected integrity measurement for the process 108.

The helper agent 106 determines, as depicted at 424, an authentication code (called "$Auth\_Code_{NEW}$" herein) for the heartbeat message 429. For this purpose, the helper agent 106 determines a message input (called $M_{NEW}$) based on the nonce $N_{NEW}$ and the status T of the user space process 108, and the helper agent 106 determines a cryptographic key input (called $K_{NEW}$) based on the digest $D_{NEW}$ and the request identifier $R_{NEW}$, as described below in Eqs. 8 and 9:

$$M_{NEW}=(N_{NEW}+1)\|T, \text{ and} \qquad \text{Eq. 8}$$

$$K_{NEW}=K_{DEV}(D_{NEW}\|R_{NEW}). \text{ and} \qquad \text{Eq. 9}$$

The helper agent 106 provides the message input $M_{NEW}$ and the key input $K_{NEW}$ as inputs to a keyed hashing algorithm to generate the authentication code Auth_Code-$_{NEW}$, as described below:

$$Auth\_Code_{NEW}=\text{Keyed\_Hash}(M_{NEW},K_{NEW}). \qquad \text{Eq. 10}$$

The helper agent 106 may then generate the heartbeat message 429, as depicted at 428. In an example, the heartbeat message 429 may include a payload portion that includes data that represents the status T, and the heartbeat message 429 may include an authentication portion that includes data the represents the authorization code $Auth\_Code_{NEW}$.

The monitoring agent 172, responsive to receiving the heartbeat message 429, may then authenticate the heartbeat message 429, as depicted at 432. For this purpose, the monitoring agent 172 may compare an expected authorization code (called "$Auth\_Code_{EXPECTED}$" herein) to the authorization code $Auth\_Code_{NEW}$ that is contained in the heartbeat message 429. If the two authorization codes match, then the heartbeat message 429 passes authentication, and otherwise, the heartbeat message 429 fails authentication.

In an example, the monitoring agent 172 may calculate the expected authorization code $Auth\_Code_{EXPECTED}$ as follows. The monitoring agent 172 determines a status $T_{MSG}$ of the user space process 108 from a payload portion of the heartbeat message 429. The monitoring agent 172 also has knowledge of a nonce $N_{EXPECTED}$, a request identifier $R_{EXPECTED}$ and an expected integrity measurement ($D_{EXPECTED\_INT\_MEAS}$) for the user space process 108, which the monitoring agent 172 expects to have been used by the helper agent 106 in the determination of the authorization code that is contained in the heartbeat message 429. The monitoring agent 172 may then derive the expected authorization code $Auth\_Code_{EXPECTED}$ as follows:

$$M_{EXPECTED}=(N_{EXPECTED}+1)\|T_{MSG}, \qquad \text{Eq. 11}$$

$$K_{EXPECTED}=(D_{EXPECTED\_INT\_MEAS}\|R_{EXPECTED}), \text{ and} \qquad \text{Eq. 12}$$

$$Auth\_Code_{EXPECTED}=\text{Keyed\_Hash}(M_{EXPECTED},K_{EXPECTED}), \qquad \text{Eq. 13}$$

where "Keyed_Hash ( )" of Eq. 13 represents the keyed hash algorithm that the monitoring agent 172 expects to have been used by the helper agent 106 in the Applicant respectfully traverses the rejection.generation of the authorization code $Auth\_Code_{NEW}$.

If the authorization passes (i.e., the expected authorization code matches the authorization code contained in the heartbeat message 429), then the monitoring agent 172 may further determine, based on the status $T_{MSG}$, whether the process is running, as depicted at 444. If the authorization fails or the process has stopped, then in accordance with example implementations, the monitoring agent 172 may initiate one or multiple responsive actions, as depicted at 440.

Figure 5:
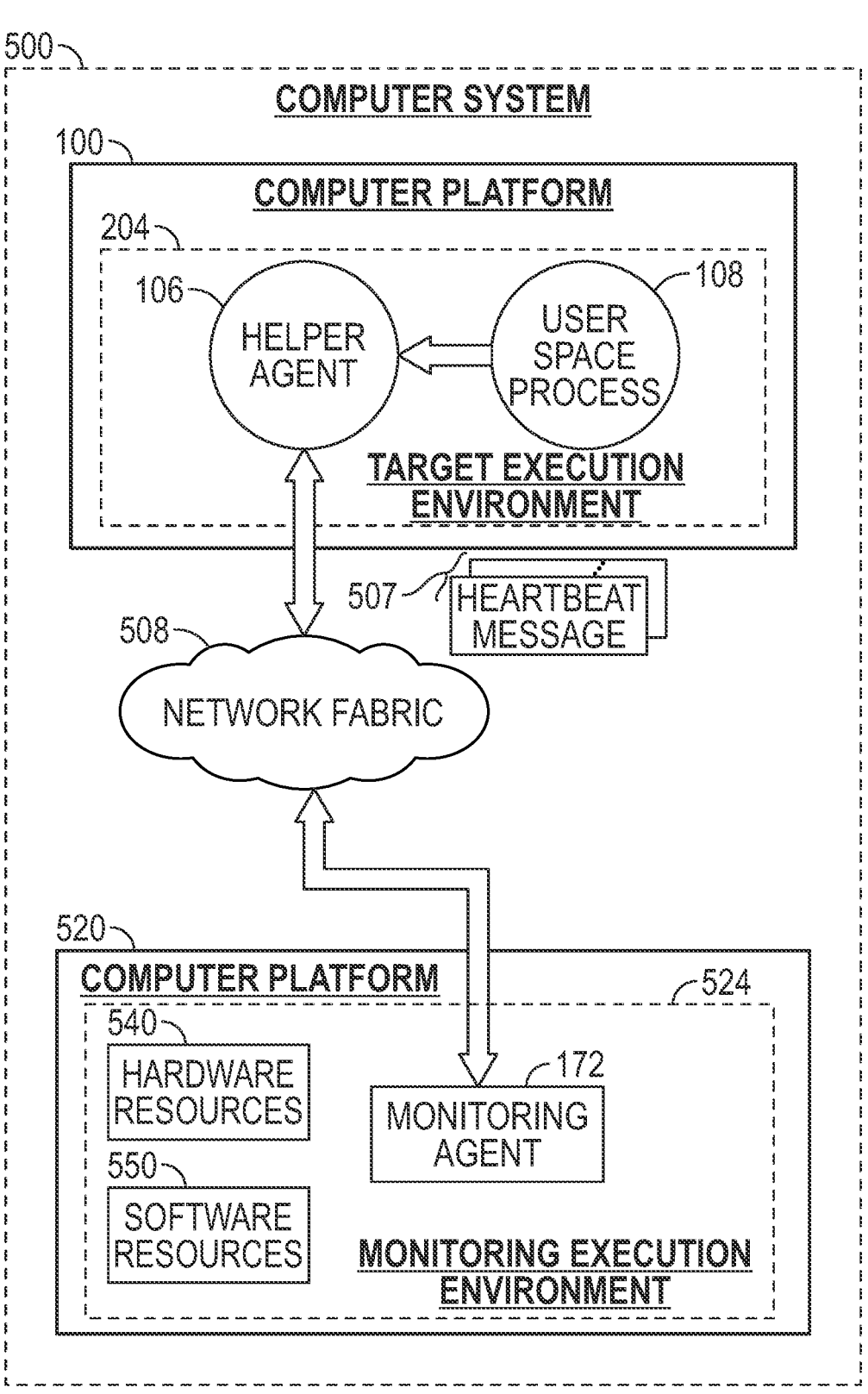
FIG. 5 is a schematic diagram of a computer system having a distributed processing monitoring infrastructure that uses heartbeat message authentication as a mechanism to detect tampering with a monitored user space process according to an example implementation.

Referring to FIG. 5, in accordance with further implementations, a process monitoring infrastructure may be hosted by multiple computer platforms 100 and 520 of a distributed computer system 500. As depicted in FIG. 5, the computer platform 520 provides a monitoring execution environment 524 that that includes a monitoring agent 172. The computer platform 100 provides a target execution environment 204 that includes a kernel-based helper agent 106 and a monitored user space process 108.

The helper agent 106 measures the user space process 108 and sends corresponding heartbeat messages 507 over network fabric 508 to the monitoring agent 172. The computer platform 520 may include various physical hardware resources 540 and software resources 550, including one or multiple resources that provide the monitoring agent 172. More specifically, the monitoring agent 172 may correspond to a physical, or actual, device of the computer platform 520 or may correspond to a virtual device of the computer platform 524, depending on the particular implementation.

The monitoring agent 172 processes the heartbeat messages 507 for purposes of determining, for each heartbeat message 507, whether a state of the user space process 108, as represented by the heartbeat message 507, is the same as an expected state for the process 108. For this purpose, the processing includes the monitoring agent 172 authenticating each heartbeat message 507 and if the heartbeat message 507 passes authentication, evaluating a status represented by the heartbeat message 507, as described herein. If the state of a heartbeat message 507 does not correspond to an expected state for the heartbeat message 507 or the monitoring agent 172 detects an interruption in the heartbeat messages 507, then the monitoring agent 172 may initiate one or multiple responsive actions.

In an example, a responsive action may include the sending of an alert message to a system administrator for the computer platform 100. In another example, a responsive action may include the sending of an alert message to a management device of the computer platform 100, such as a baseboard management controller of the computer platform 100. In another example, a responsive action may include the computer platform 520 quiescing operations conducted with the computer platform 100. In another example, a responsive action may include the computer platform 520 isolating, or quarantining, itself from the computer platform 100. In accordance with some implementations, the particular responsive action(s) taken or initiated by the monitoring agent 172 may be based on a policy that defines responsive actions and criteria for triggering the responsive actions.

In an example, the computer platform 100 may be a rack-based server or a blade server that is installed in a rack, the computer platform 520 may be chassis management controller for the rack, and the monitoring agent 172 may be a virtual or physical component of the chassis management controller. In another example, the computer platform 100 may be a rack-based server or a blade server that is installed in a rack, the computer platform 520 may be top-of-the-rack (ToR) switch, and the monitoring agent 172 may be a virtual or physical component of the ToR switch. In another example, the computer platform 100 may be a rack-based server or a blade server that is installed in a rack, the computer platform 520 may be another rack-based server or blade server of the rack, and the monitoring agent 172 may be a virtual or physical component of this other rack-based server or blade server. In another example, the computer platform 520 may be remote (e.g., located in a different data center or located in a different geographical location) with respect to the computer platform 100. In another example, the computer platform 100 may be part of a local branch network, and the computer platform 520 may be a cloud-based server that provides monitoring services (including process monitoring by the monitoring agent 172).

Referring to FIG. 6, in accordance with example implementations, a technique 600 includes receiving (block 604), by a monitoring agent, heartbeat messages that are associated with a status of a process of a computer system. In an example, the process may be a user space process. In an example, the monitoring device may be a peripheral device. In an example, the peripheral device may be connected via at least one interconnect to a kernel-based agent that generates the heartbeat messages. In an example, the peripheral device may be a virtual or a physical component of the computer system. In an example, the peripheral device may be a smart I/O peripheral device, or a baseboard management controller of the computer system. In an example, the monitoring agent may be part of an execution environment that is separate from an execution environment of the process. In an example, the status of the process is an indication of whether the process is running or stopped. In an example, receiving the heartbeat messages includes the monitoring agent communicating with a kernel-based agent via a socket. In an example, receiving the heartbeat messages includes the monitoring agent decrypting the heartbeat messages via a cryptographic session key. In an example, receiving the heartbeat messages includes the monitoring agent communicating with a kernel-based agent via shared memory location. In an example, receiving the heartbeat messages per a pull-based communication model in which requests are sent for the heartbeat messages. In an example, receiving the heartbeat messages includes receiving the messages per a push-based communication model in which the heartbeat messages are generated according to a predetermined schedule. In an example, the predetermined schedule may be a periodic schedule.

The technique 604 includes determining (block 608), by the monitoring agent and based on the heartbeat messages, whether the process has an expected state. The determination includes authenticating a given heartbeat message based on a content of the given heartbeat message and an expected integrity measurement of the process. In an example, the given heartbeat message is authenticated based on authentication code of the given heartbeat message. In an example, authenticating the given heartbeat message may include determining an expected authentication code for the given heartbeat message and comparing the expected authentication code to an authentication code contained in the given heartbeat message. In an example, determining the expected authentication code may include generating a hash-based message authentication code (HMAC). In an example, generating the expected authentication code may include applying a keyed-hash algorithm. In an example, determining the expected authentication code may include generating a message input for a keyed-hash algorithm based on a payload content of the given heartbeat message. In an example, generating an expected authentication code may include generating a cryptographic key input for a keyed-hash algorithm based on the expected integrity measurement. In an example, the expected integrity measurement corresponds to a hash of an invariant part of a memory space associated with the user space process. In an example, the expected integrity measurement corresponds to an invariant part of machine-executable instructions stored in an executable file that corresponds to the user space process. In an example, the expected integrity measurement corresponds to a process path of the user space process. In an example, the expected integrity measurement includes a hash of an input derived from a library linked to the user space process.

The process 600 includes initiating (block 612) by the monitoring agent, a responsive action to counter tampering with the process responsive to the determination of whether the process has an expected state. In an example, the responsive action may include powering down a computer platform. In an example, a responsive action may include rebooting a computer platform. In an example, a responsive action may include generating data to display an alert message. In an example, a responsive action may include sending an alert message to a remote management server. In an example, a responsive action may include preventing a reboot of the computer platform unless a password, a key or another credential is provided. In an example, a responsive action may include quarantining a computer platform from an external network. In an example, a responsive action may include quiescing operations conducted with a computer platform. In an example, a responsive action may include communicating an alert message to a baseboard management controller of a computer platform.

Referring to FIG. 7, in accordance with example implementations, a non-transitory machine-readable storage medium 700 stores machine-readable instructions 710 that correspond to an operating system kernel agent. The instructions 710, when executed by the machine, cause the machine to measure a user space process to provide an integrity measurement of the user space process. In an example, the expected integrity measurement corresponds to a hash of an invariant part of a memory space associated with the user space process. In an example, the integrity measurement corresponds to an invariant part of a user space process. In an example, the integrity measurement corresponds to a process path of the user space process. In an example, the integrity measurement includes a hash of an input derived from a library linked to the user space process.

The instructions 710, when executed by the machine, further cause the machine to determine a status of the user space process. In an example, the status may indicate whether the user space process is running. In another example, the status may indicate whether the user space process has stopped. In another example, the status may indicate whether the user space process is in an uninterruptible sleep. In another example, the status may indicate whether the user space process is in an interruptible sleep state. In another example, the status may indicate whether the user state process is a zombie. In another example, the status may indicate a start time of the user space process. In another example, the status may be multi-dimensional and represent multiple characteristics of the user space process.

The instructions 710, when executed by the machine, further cause the machine to provide, to a monitoring agent, a report associated with the user space process. Providing the report includes determining an authentication code based on the integrity measurement and the status; generating a message that includes data representing the status and the authentication code; and sending the message to the monitoring agent. In an example, the message is a heartbeat message that is expected to be received by the monitoring agent within a certain time period. In an example, sending the message includes sending the message according to a push-based communication model. In an example, sending the message includes sending the message according to a pull-based communication model. In an example, sending the message includes communicating with the monitoring agent via a shared memory. In an example, sending the message includes communicating with the monitoring agent via a socket of the kernel. In an example, sending the message includes using communicating with the monitoring agent using authenticated encryption.

Figure 8:
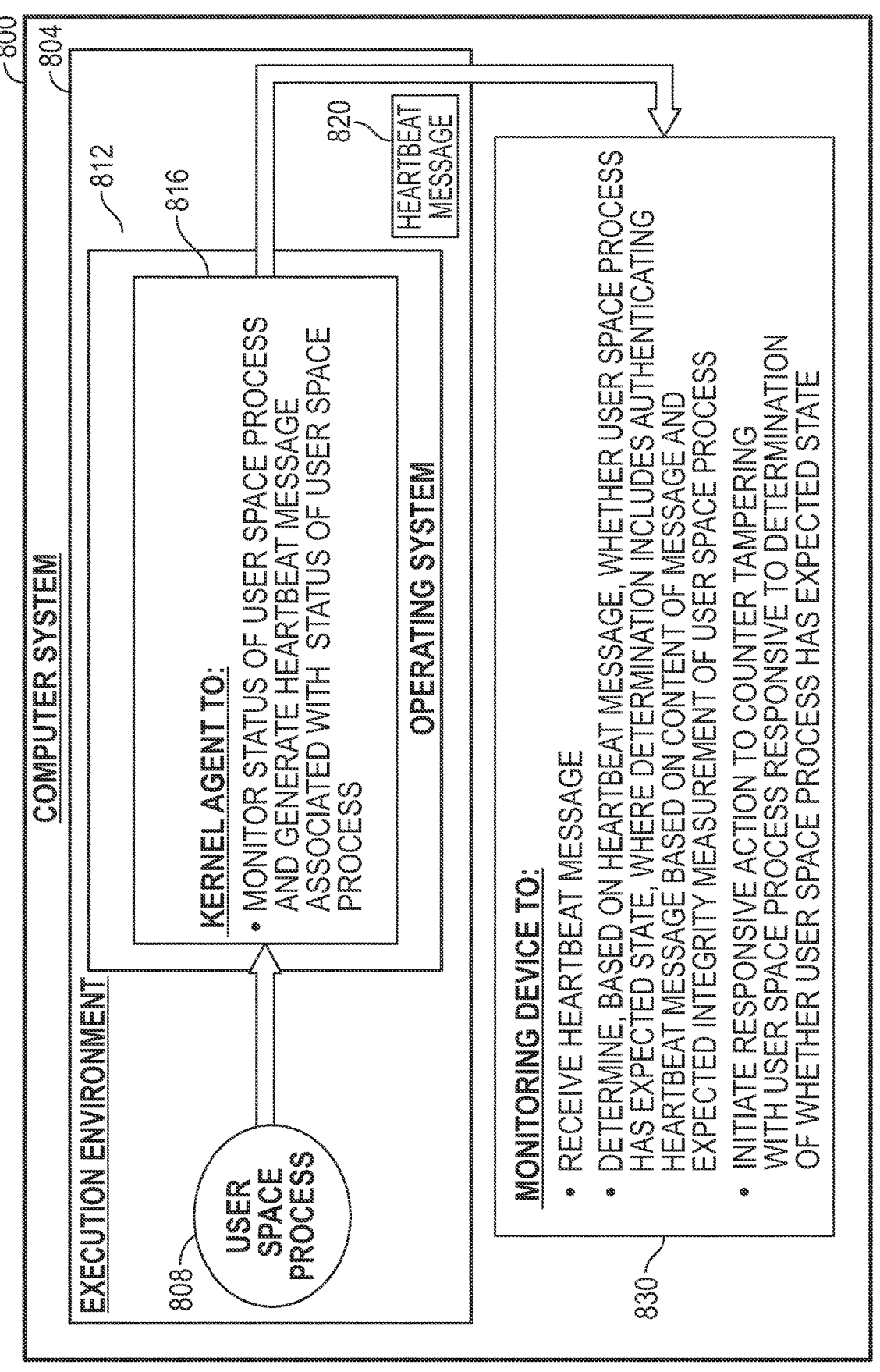
FIG. 8 is a schematic diagram of a computer system having a monitoring device to authenticate a heartbeat message associated with the status of a user space process based on an integrity measurement of the process according to an example implementation.

Referring to FIG. 8, in accordance with example implementations, a computer system 800 includes an execution environment 804 and a monitoring device 830 that is external to the execution environment 804. The execution environment 804 includes a user space process 808 and an operating system 812. In an example, the operating system 812 may be a LINUX operating system. In another example, the operating system 812 may be a WINDOWS NT operating system. In an example, the monitoring device 830 may be a baseboard management controller. In another example, the monitoring device 830 may be a network interface controller. In another example, the monitoring device 830 may be a smart I/O peripheral. In another example, the monitoring device 830 may be a physical component. In another example, the monitoring device 830 may be a virtual component.

The operating system 812 includes a kernel agent 816 to monitor a status of the user space process 804 and generate a heartbeat message that is associated with the status of the user space process. In an example, the kernel agent 816 may correspond to a loadable kernel module. In another example, the kernel agent 816 may corresponding to a kernel driver. In another example, the kernel agent 816 may correspond to an eBPF module. In an example, the status may indicate whether the user space process is running or stopped. In an example, the status may be multi-dimensional and indicated multiple characteristics of the user space process. In example, the kernel agent 816 may send the heartbeat message 820 to the monitoring device 830 according to a push-based communication model. In another example, the kernel agent 816 may send the heartbeat message 820 to the monitoring device 830 according to a pull-based communication model. In another example, the kernel agent 816 may send the heartbeat message 820 to the monitoring device 830 via a memory segment shared between the kernel agent 816 and the monitoring device 830. In another example, the kernel agent 816 may send the heartbeat message 820 to the monitoring device 830 via a socket of the kernel. In another example, the kernel agent 816 may send the heartbeat message 820 to the monitoring device 830 using authenticated encryption.

The monitoring device 830 receives the heartbeat message; and determines, based on the heartbeat message, whether the user space process has an expected state. Determining whether the user space process has an expected state includes authenticating the heartbeat message based on a content of the heartbeat message and an expected integrity measurement of the user space process. In an example, the expected integrity measurement may correspond to a measurement of a text segment of a memory space occupied by the user space process after a measured and secure boot of the computer system. In another example, the expected integrity measurement may correspond to a measurement of an invariant part of an executable file corresponding to the user space process.

The monitoring device 830 initiates a responsive action to counter tampering with the user space process 808 responsive to the determination of whether the user space process 808 has an expected state. In an example, the responsive action may include powering down a computer platform. In another example, a responsive action may include rebooting a computer platform. In another example, a responsive action may include generating data for purposes of displaying an alert. In another example, a responsive action may include sending an alert message to a system administrator. In another example, a responsive action may include sending an alert message to a remote management server. In another example, a responsive action may include imposing a restriction that a certain password, key or other credential (e.g., a credential supplied by a system administrator) is to be provided before a computer platform is allowed to reboot. In another example, a responsive action may include quarantining a computer platform from an external network. In another example, a responsive action may include quiescing operations of a computer platform associated with an entity external to the computer platform.

In accordance with example implementations, the heartbeat message includes a first authentication code and a message content that represents a status of the process. Authenticating the message includes determining a cryptographic key based on the expected integrity measurement; determining a second authentication code based on the cryptographic key and the message content; and comparing the second authentication code to the first authentication code. Among the potential advantages, the heartbeat message authentication provides a mechanism to detect tampering with a process that has been compromised but continues to run.

In accordance with example implementations, the monitoring device generates a nonce and the monitoring device sends the nonce to an operating system agent that provides the heartbeat. Determining the second authentication code further includes generating an input for a keyed-hash function based on the content of the message and the nonce; and applying the keyed-hash function to the input based on the cryptographic key to provide the second authentication code. Among the potential advantages, the heartbeat message authentication provides a mechanism to detect tampering with a process that has been compromised but continues to run.

In accordance with example implementations, the monitoring device sends a randomly-generated or a pseudo-randomly-generated request identifier to an operating system agent that provides the heartbeat. Determining the second authentication code further includes generating an input for a keyed-hash function based on the content of the message; determining the cryptographic key based on the concatenation of the request identifier and the expected integrity measurement; and applying a keyed-hash function to the input based on the cryptographic key to provide the second authentication code. Among the potential advantages, the heartbeat message authentication provides a mechanism to detect tampering with a process that has been compromised but continues to run.

In accordance with example implementations, determining whether the process has an expected state includes evaluating a status of the process represented by the content. Among the potential advantages, the heartbeat message authentication provides a mechanism to detect tampering with a process that has been compromised but continues to run.

In accordance with example implementations, the expected integrity measurement is determined based on a content of a user space that is associated with the process.

Among the potential advantages, the heartbeat message authentication provides a mechanism to detect tampering with a process that has been compromised but continues to run.

In accordance with example implementations, responsive to a boot of the computer system, the monitoring agent sends a registration request to an operating system of the computer system. The monitoring agent, responsive to the registration request, receives a second message that includes content that corresponds to the expected integrity measurement. Among the potential advantages, the heartbeat message authentication provides a mechanism to detect tampering with a process that has been compromised but continues to run.

In accordance with example implementations, the second message further includes an authentication code, and sending the registration request includes sending, by the monitoring agent and to the operating system agent, a message containing a randomly-generated or pseudorandomly-generated nonce and containing a randomly-generated or a pseudo-randomly request identifier. Responsive to receiving the second message, the monitoring agent authenticates the second message based on the content corresponding to the expected integrity measurement, the nonce, the request identifier and the authentication code. Among the potential advantages, the heartbeat message authentication provides a mechanism to detect tampering with a process that has been compromised but continues to run.

In accordance with example implementations, the monitoring agent determines the expected integrity measurement based on a content of an executable file that is associated with the process. Among the potential advantages, the heartbeat message authentication provides a mechanism to detect tampering with a process that has been compromised but continues to run.

In accordance with example implementations, the monitoring agent sends a request for the message. Among the potential advantages, the heartbeat message authentication provides a mechanism to detect tampering with a process that has been compromised but continues to run.

The detailed description set forth herein refers to the accompanying drawings. Wherever possible, the same reference numbers are used in the drawings and the foregoing description to refer to the same or similar parts. It is to be expressly understood, however, that the drawings are for the purpose of illustration and description only. While several examples are described in this document, modifications, adaptations, and other implementations are possible. Accordingly, the detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
determining an expected integrity measurement of a process of a computer system, wherein determining the expected integrity measurement of the process comprises at least one of determining a hash of a content of a memory associated with the process or determining a hash of a content of an executable file associated with the process;
communicating, by a monitoring agent and with an operating system, to receive, by the monitoring agent, heartbeat messages associated with a status of the process;
determining, by the monitoring agent and based on the heartbeat messages, whether the process has an expected state, wherein determining whether the process has an expected state comprises authenticating a given heartbeat message of the heartbeat messages based on a content of the given heartbeat message and the expected integrity measurement of the process; and
initiating, by the monitoring agent, a responsive action to counter tampering with the process responsive to the determination of whether the process has an expected state.

2. The method of claim 1, wherein:
the content of the given heartbeat message comprises a first authentication code and a payload content; and
authenticating the given heartbeat message comprises:
determining, by the monitoring agent, a cryptographic key based on the expected integrity measurement;
determining, by the monitoring agent, a second authentication code based on the cryptographic key and the payload content; and
comparing, by the monitoring agent, the second authentication code to the first authentication code.

3. The method of claim 2, further comprising:
generating, by the monitoring agent, a nonce; and
sending, by the monitoring agent, the nonce, to an operating system agent that provides the heartbeat messages,
wherein determining the second authentication code further comprises:
generating, by the monitoring agent, an input for a keyed-hash function based on the payload content and the nonce; and
applying, by the monitoring agent, the keyed-hash function to the input based on the cryptographic key to provide the second authentication code.

4. The method of claim 2, further comprising:
sending, by the monitoring agent, a randomly-generated request identifier or a pseudorandomly-generated request identifier to an operating system agent that provides the heartbeat messages, wherein determining the second authentication code further comprises:
generating, by the monitoring agent, an input for a keyed-hash function based on the payload content;
determining, by the monitoring agent, the cryptographic key based on a concatenation of the request identifier and the expected integrity measurement; and
applying, by the monitoring agent, a keyed-hash function to the input based on the cryptographic key to provide the second authentication code.

5. The method of claim 1, wherein determining whether the process has an expected state comprising evaluating, by the monitoring agent, a status of the process represented by the payload content.

6. The method of claim 1, further comprising:
responsive to a boot of the computer system, sending, by the monitoring agent, a registration request to an operating system agent of the computer system; and
receiving, by the monitoring agent and responsive to the registration request, a response message comprising payload content corresponding to the expected integrity measurement.

7. The method of claim 6, wherein the response message further comprises an authentication code, and sending the registration request comprises sending, by the monitoring agent and to the operating system agent, a message containing data representing a nonce and a request identifier, the method further comprising, responsive to receiving the response message:
authenticating, by the monitoring agent, the response message based on the payload content corresponding to the expected integrity measurement, the nonce, the request identifier and the authentication code.

8. The method of claim 1, further comprising sending, by the monitoring agent, a request for the given message.

9. A non-transitory machine-readable storage medium that stores machine-readable instructions corresponding to an operating system kernel agent, wherein the machine-readable instructions, when executed by a hardware processor of a machine, cause the hardware processor to:
determine a hash of content corresponding to a user space process to measure the user space process to provide an integrity measurement of the user space process;
determine a status of the user space process; and
provide, to a monitoring agent, a report associated with the user space process, wherein providing the report comprises:
determining an authentication code based on the integrity measurement and the status of the user state process;
generating a message comprising data representing the status and the authentication code; and
sending the message to the monitoring agent.

10. The non-transitory machine-readable storage medium of claim 9, wherein the machine-readable instructions, when executed by the hardware processor, further cause the hardware processor to:
identify a text segment of a memory space corresponding to the user space process;
generate a hash of content corresponding to the text segment to provide the integrity measurement.

11. The non-transitory machine-readable storage medium of claim 9, wherein the machine-readable instructions, when executed by the hardware processor, further cause the hardware processor to:

identify a text segment of a user space corresponding to the user space process;

determine invariant content corresponding to a library dynamically linked to the user space process; and generate a hash based on the content of the text segment and the invariant content to provide the integrity measurement.

12. The non-transitory machine-readable storage medium of claim 9, wherein the machine-readable instructions, when executed by the hardware processor, further cause the hardware processor to:

identify a text segment of a user space corresponding to the user space process;

access a first content of the text segment;

determine a runtime invariant content associated with the user space process other than the first content;

combine the first content and the runtime invariant content to provide an input;

apply the input to a hash function to provide the integrity measurement from which the authentication code is determined.

13. The non-transitory machine-readable storage medium of claim 12, wherein the runtime invariant content comprises data representing at least one of a process path corresponding to the user space process, a name of an executable file corresponding to the user space process, an argument passed to the user space process, or a version of the executable file.

14. The non-transitory machine-readable storage medium of claim 9, wherein the machine-readable instructions, when executed by the hardware processor, further cause the hardware processor to:

determine an input for a keyed-hash function based on a nonce provided by the monitoring agent; and determine a cryptographic key for the keyed-hash function based on the integrity measurement and a request identifier provided by the monitoring agent, wherein determining the authentication code comprises applying the keyed-hash function to the input using the cryptographic key to provide the authentication code.

15. The non-transitory machine-readable storage medium of claim 9, wherein the machine-readable instructions, when executed by the hardware processor, further cause the hardware processor to push the message to the monitoring agent.

16. A computer system comprising:

a first computer platform comprising an execution environment, wherein the execution environment comprises:

a user space process; and an operating system comprising a kernel agent to monitor a status of the user space process and generate a heartbeat message associated with the status of the user space process; and a second computer platform comprising a processor-based controller external to the execution environment and comprising a hardware processor to:

receive the heartbeat message;

determine, based on the heartbeat message, whether the user space process has an expected state, wherein determining whether the user space process has an expected state comprises authenticating the heartbeat message based on a content of the heartbeat message and an expected integrity measurement of the user space process, wherein the expected integrity measurement comprises at least one of a hash of a content of a memory associated with the user space process or a hash of a content of an executable file associated with the user space process; and initiate a responsive action to counter tampering with the user space process responsive to the determination of whether the user space process has an expected state.

17. A computer system comprising:

a computer platform comprising:

an execution environment comprising:

a user space process; and an operating system comprising a kernel agent to monitor a status of the user space process and generate a heartbeat message associated with the status of the user space process; and a processor-based controller external to the execution environment and comprising a hardware processor to:

receive the heartbeat message;

determine, based on the heartbeat message, whether the user space process has an expected state, wherein determining whether the user space process has an expected state comprises authenticating the heartbeat message based on a content of the heartbeat message and an expected integrity measurement of the user space process, wherein the expected integrity measurement comprises at least one of a hash of a content of a memory associated with the user space process or a hash of a content of an executable file associated with the user space process; and initiate a responsive action to counter tampering with the user space process responsive to the determination of whether the user space process has an expected state.

18. The computer system of claim 17, further comprising an interconnect, wherein the processor-based controller comprises a peripheral device to communicate with the kernel agent via the interconnect.

* * * * *